US006233501B1

(12) United States Patent
Hirai et al.

(10) Patent No.: US 6,233,501 B1
(45) Date of Patent: May 15, 2001

(54) SYSTEM FOR ENGRAVING A PLURALITY OF GRAVURE ROLLS

(75) Inventors: Keisuke Hirai; Tadashi Syudou; Takumi Yoshida; Yoshikazu Matsuno, all of Kyoto (JP)

(73) Assignee: Dainippon Screen Mfg. Co. Ltd. (JP)

( * ) Notice: Subject to any disclaimer, the term of this patent is extended or adjusted under 35 U.S.C. 154(b) by 0 days.

(21) Appl. No.: 09/059,237

(22) Filed: Apr. 13, 1998

Related U.S. Application Data

(62) Division of application No. 08/682,881, filed on Jul. 11, 1996.

(30) Foreign Application Priority Data

| | | |
|---|---|---|
| Jul. 14, 1995 | (JP) | 7-179026 |
| Aug. 28, 1995 | (JP) | 7-218949 |
| Aug. 28, 1995 | (JP) | 7-218950 |
| Aug. 30, 1995 | (JP) | 7-222076 |

(51) Int. Cl.[7] .......... G06F 7/00
(52) U.S. Cl. .......... 700/213; 358/299
(58) Field of Search .......... 700/213; 358/299

(56) References Cited

U.S. PATENT DOCUMENTS

| | | | |
|---|---|---|---|
| 3,964,382 | 6/1976 | Baar et al. . | |
| 4,013,829 | 3/1977 | Baar et al. . | |
| 5,493,939 | 2/1996 | Bornhorst, Jr. . | |
| 5,583,647 * | 12/1996 | Izor et al. | 358/299 |
| 5,652,659 | 7/1997 | Bornhorst, Jr. et al. . | |
| 5,822,078 * | 10/1998 | Hirai et al. | 358/299 |

FOREIGN PATENT DOCUMENTS

| | | |
|---|---|---|
| 0595324 | 10/1993 | (EP) . |
| 789036 | 4/1995 | (JP) . |
| 9605966 | 2/1996 | (WO) . |

* cited by examiner

*Primary Examiner*—Christopher P. Ellis
*Assistant Examiner*—Khoi H. Tran
(74) *Attorney, Agent, or Firm*—Ostrolenk, Faber, Gerb & Soffen, LLP

(57) ABSTRACT

A gravure engraving system that capable of successively engraving each of a plurality of gravure cylinders through no intermediary of a manual operation, includes a transport device for transporting a gravure cylinder. The transport device is disposed between an engraving machine for engraving the circumferential surface of a gravure cylinder and a stock device which stores a plurality of gravure cylinders. A predetermined gravure cylinder is selected out of the gravure cylinders stared in the stock device and transported to the engraving machine by the transport device. After the transported gravure cylinder has been automatically set on the engraving machine, the gravure cylinder is engraved. Thereafter, the transport device transports the engraved gravure cylinder to the stock device where the engraved gravure cylinder is stored.

8 Claims, 31 Drawing Sheets

SYSTEM FOR ENGRAVING A PLURALITY OF GRAVURE ROLLS

This is a division of application Ser. No. 08/682,881, filed Jul. 11, 1996.

BACKGROUND OF THE INVENTION

1. Field of the Invention

The present invention relates to a gravure engraving system and more particularly to a system for automatically supplying and discharging a gravure cylinder to or from a gravure cylinder engraving machine.

2. Description of Related Art

A gravure cylinder will serve as a printing plate and has a surface to be engraved by a gravure engraving machine. The gravure engraving machine is arranged such that, using a diamond bite or stylus, concave points (cells) are formed in the circumferential surface of a gravure cylinder under rotation. The basic arrangement of the gravure engraving machine is discussed for example in U.S. Pat. No. 3,964,382, U.S. Pat. No. 4,013,829 and European Unexamined Patent Publication No. 0,595,324 A1 which is a counterpart of U.S. patent application Ser. No. 08/143,552, the entire disclosure of which United States patents and application are incorporated herein by reference.

Conventionally, a gravure cylinder is to be mounted on a gravure engraving machine by raising the same manually or with a crane. Also, an engraved gravure cylinder is removed from the gravure engraving machine while the same is being raised manually or with a crane.

Accordingly, continuously engraving each of a plurality of gravure cylinders requires many hands for mounting and dismounting such a cylinder on and from a gravure engraving machine.

SUMMARY OF THE INVENTION

A gravure engraving system constructed according to the present invention comprises an engraving machine for engraving the circumferential surface of a gravure cylinder, a stock device for storing a plurality of gravure cylinders and a transport device for transporting a gravure cylinder between the engraving machine and the stock device. The engraving machine is arranged to engrave the circumferential surface of a gravure cylinder while the same is being rotated at a predetermined speed with the both ends thereof supported.

With the engraving system of the instant invention in operation, a predetermined gravure cylinder is selected from the gravure cylinders stored in the stock device and is transported to the engraving machine by the transport device. When the transported gravure cylinder has been automatically set in the engraving machine, the gravure cylinder is engraved. Thereafter, the engraved gravure cylinder is again transported and stored in the stock device by the transport device. Thus, gravure cylinders can continuously automatically be engraved.

Preferably, the transport device comprises: at least two arms for supporting a gravure cylinder from underneath; vertical drive means for vertically moving the arms for vertically moving the gravure cylinder; horizontal drive means for moving the arms in a first horizontal direction, thereby to transport the gravure cylinder between the stock device and the engraving machine; and orthogonal drive means for moving at least one of the arms in a second horizontal direction orthogonal to said first horizontal direction such that the distance between the two arms is changed.

Preferably, the stock device comprises: a plurality of placing stands on which gravure cylinders are placed such that the axes thereof extend substantially horizontally; and a holding mechanism for holding the plurality of placing stands in a revolving manner. According to such an arrangement, a plurality of gravure cylinders can efficiently be stored.

Preferably, each placing stand comprises at least two holding portions to come in contact with part of the circumferential surface of a gravure cylinder placed on the placing stand. Preferably, each placing stand is arranged such that there is defined, under the gravure cylinder as held by the holding portions, a space into which the arms of the transport device are adapted to enter. According to such an arrangement, the arms are horizontally movable can enter the space under the gravure cylinder to hold the same from underneath. Preferably, at least one of the holding portions is horizontally movable on the placing stand. With such an arrangement, any of gravure cylinders having different lengths can be held by each placing stand and can readily and securely be unloaded by the arms.

The engraving machine may have a pair of cone units for holding a gravure cylinder at both ends thereof. Preferably, one cone unit comprises a cone to engage with an end of a gravure cylinder and cone drive means for moving the cone toward and away from the other cone unit, and the other cone unit comprises a cone to engage with the other end of the gravure cylinder and ejecting means for ejecting the gravure cylinder engaged with the cone in such a direction in which the gravure cylinder is disengaged from the cone.

Preferably, the transport device is interposed between the stock device and the engraving machine; and the gravure engraving system further comprises a guide member for guiding the transport device to a retreat position where the transport device is being retracted from a position between the engraving machine and the stock device. In such an arrangement, the transport device is preferably movable between the position where the transport device is interposed between the stock device and the engraving machine for transporting a gravure cylinder, and the retreat position where the transport device is being retreated.

According to the arrangement above-mentioned, when the transport device is retreated or retracted from the position between the stock device and the engraving machine, the stock device, the transport device and the engraving machine are not adjacent to one another. This facilitates maintenance on any of the devices and machine.

The engraving machine may be disposed in a plural number and the plural engraving machines may be disposed in series. In such an arrangement, a guide member is preferably disposed in parallel with the plurality of engraving machines disposed in series. Preferably, the transport device is movable along the guide member and is capable of facing a predetermined engraving machine such that a gravure cylinder is delivered between the predetermined engraving machine and the transport device. According to such an arrangement, a plurality of engraving machines can automatically be operated to improve the productivity. Further, the transport device and the stock: device can be shared with the plurality of engraving machines.

The stock device may be disposed in a plural number and the plural stock devices may be disposed in series. In such an arrangement, a guide member is preferably disposed in parallel with the plurality of stock devices disposed in series. Preferably, the transport device is movable along the guide member and is capable of facing a predetermined stock device such that a gravure cylinder is delivered between the predetermined stock device and the transport device. According to the arrangement above-mentioned, since the plurality of transport devices are disposed, the automatic operation can be conducted for a long period of time. Further, while a gravure cylinder is being unloaded from one stock device by the transport device, the next gravure cylinder can be stored in another stock device or an engraved gravure cylinder can be unloaded from still another stock device. This achieves an efficient operation.

Accordingly, the primary object of the present invention is to provide a gravure engraving system capable of continuously engraving each of a plurality of gravure cylinders without the necessity of utilizing manual intervention.

Another object of the present invention is to provide transport device having means measuring the length and diameter of a gravure cylinder to be transported.

Still another object of the present invention is to provide a transport device capable of transporting gravure cylinders having a variety of lengths, between a stock device and an engraving machine in a gravure engraving system.

A further object of the present invention is to provide a transport device for transporting a gravure cylinder between a stock device and an engraving machine in a gravure engraving system.

A still further object of the present invention is to provide a transport device having a long transport length, yet in a compact design.

The foregoing objects as well as other objects and advantages of the present invention will be more fully apparent from the following detailed description set forth below when taken in conjunction with the accompanying drawings.

DESCRIPTION OF THE PREFERRED EMBODIMENTS

General Arrangement

Figure 1:
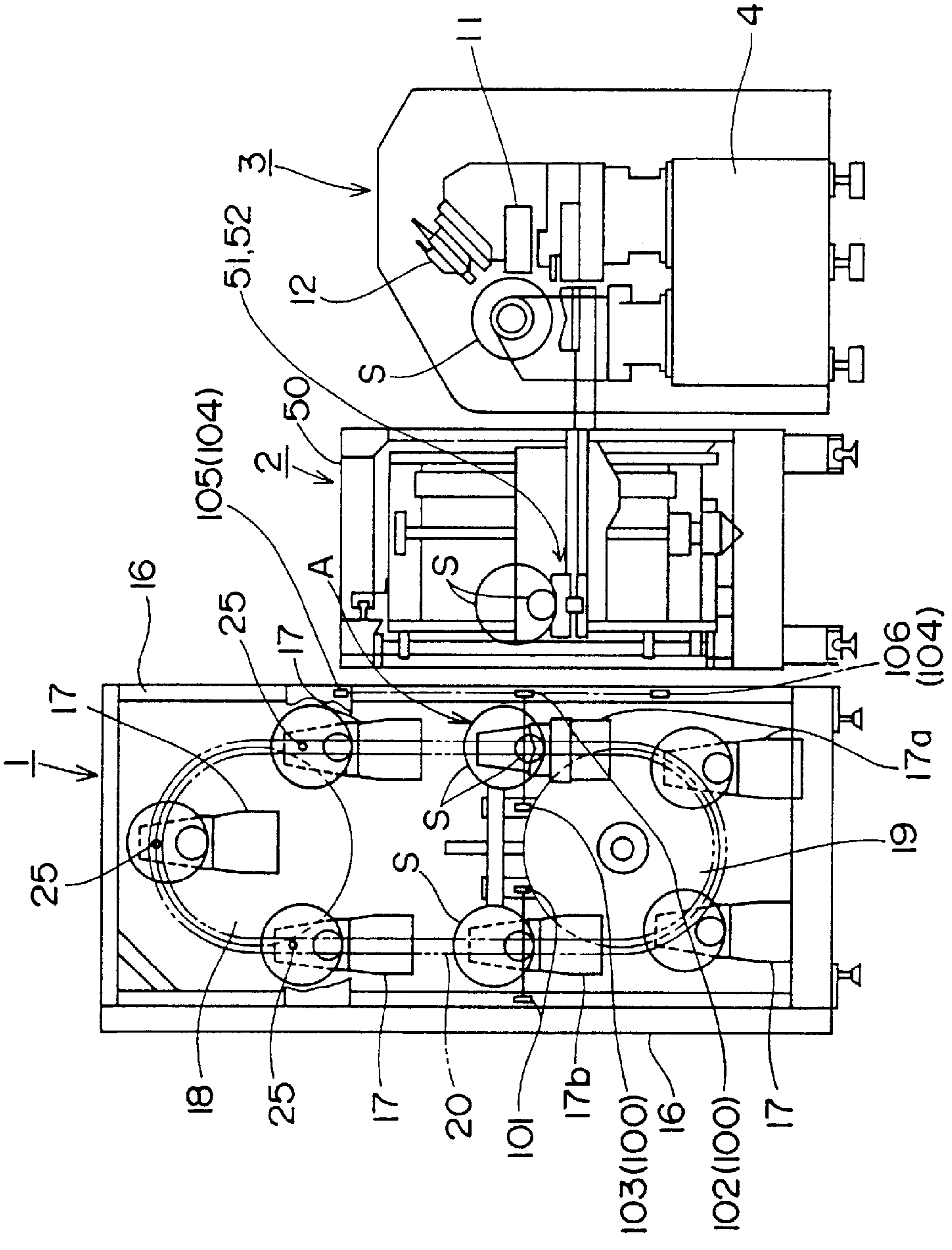
FIG. 1 is a right side view of a gravure engraving system according to an embodiment of the present invention.
Figure 2:
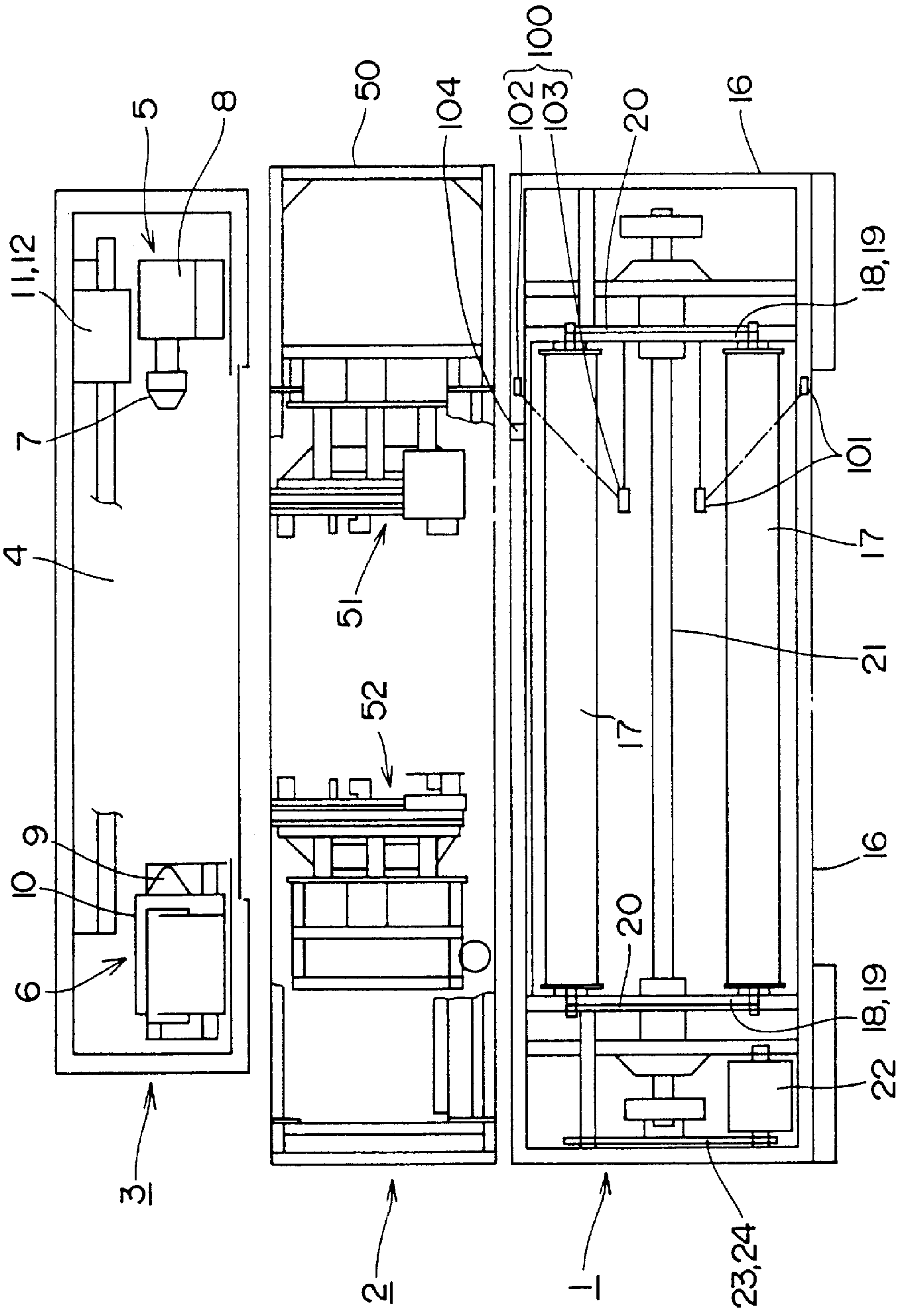
FIG. 2 is a plan view of the gravure engraving system according to the embodiment of the present invention.

Now referring more particularly to FIGS. 1 and 2, the gravure engraving system is constituted by a stocker 1, a transport device 2 and an engraving machine 3, of which outward shapes are individually formed by frames and which are disposed in close vicinity to one another. In the specification, the description will be made based on the premise that the stocker 1 is placed on this side and that the front view refers to a view where the system is observed from this side the stocker 1.

Arrangement of the Engraving Machine 3

The engraving machine 3 is arranged to engrave a gravure cylinder S and provided with a bed 4 on which disposed are a first cone unit 5 and a second cone unit 6. The first cone unit 5 is constituted by a stationary cone 7 rotatably disposed above the bed 4, and a drive device 8 for rotating the stationary cone 7. The second cone unit 6 is movable above the bed 4 transversely as viewed from the front side. The second cone unit 6 is constituted by a rotatably supported and transversely movable cone 9, and a moving device 10 for moving the movable cone 9.

The gravure cylinder S is supported as held at both ends thereof by and between the stationary cone 7 and the movable cone 9, and is to be rotated with the rotation of the stationary cone 7. An engraving head 11 is moved at a predetermined pitch or speed from the right hand to the left hand in FIG. 2 such that concave points (cells) are successively formed in the circumferential surface of the gravure cylinder S under rotation. Mounted on the engraving machine 3 is an inspection camera 12 for monitoring the state of the cells formed in the gravure cylinder S.

Arrangement of the Stocker 1

In the stocker 1, the rectangular parallelopiped outward shape is formed by a frame 16 of iron for example. The stocker 1 holds, in a rotary manner, a plurality of placing stands 17 on each of which a gravure cylinder S is to be placed. In this connection, the stocker 1 is provided at upper and lower portions of each of the right and left lateral sides thereof with chain gears 18 and 19. As shown in FIG. 1, a chain 20 is installed on the chain gears 18 and 19 respectively disposed at upper and lower portions of the right lateral side. Also, a chain 20 is installed on the chain gears 18 and 19 respectively disposed at upper and lower portions of the left lateral side. For example, the chain gears 19 at the lower portions of the right and left lateral sides are coupled to each other by a shaft 21 as shown in FIG. 2.

Referring to FIG. 2, the stocker 1 is provided for example at the left end thereof with a motor 22 as a drive source. The rotation force of the motor 22 is transmitted to a gear 24 coupled to the left end of the shaft 21 through a chain 23. Therefore, when the motor 22 is rotated, the gear 24 is rotated to rotate the shaft 21. This causes the lower left and right chain gears 19 attached to the shaft 21 to be synchronously rotated. The rotation of the lower left and right chain gears 19 circulates the chains 20 installed on the upper and lower chain gears 18 and 19 disposed at the left and right sides.

Disposed at each of the right and left chains 20 are a plurality of hanging pins 25 at regular spatial intervals in the lengthwise direction of each chain 20. The hanging pins 25 at each chain project toward the other chain. The plural hanging pins 25 at the right-side chain 20 and the plural hanging pins 25 at the left-side chain 20 are disposed in the form of a plurality of pairs such that the hanging pins 25 at the right- and left-side chains 20 of each pair are opposite to each other in the horizontal direction.

The plural placing stands 17 are swingingly hung down by the hanging pins 25 at the right- and left-side chains 20.

Arrangement of Each Placing Stand 17

Figure 3:
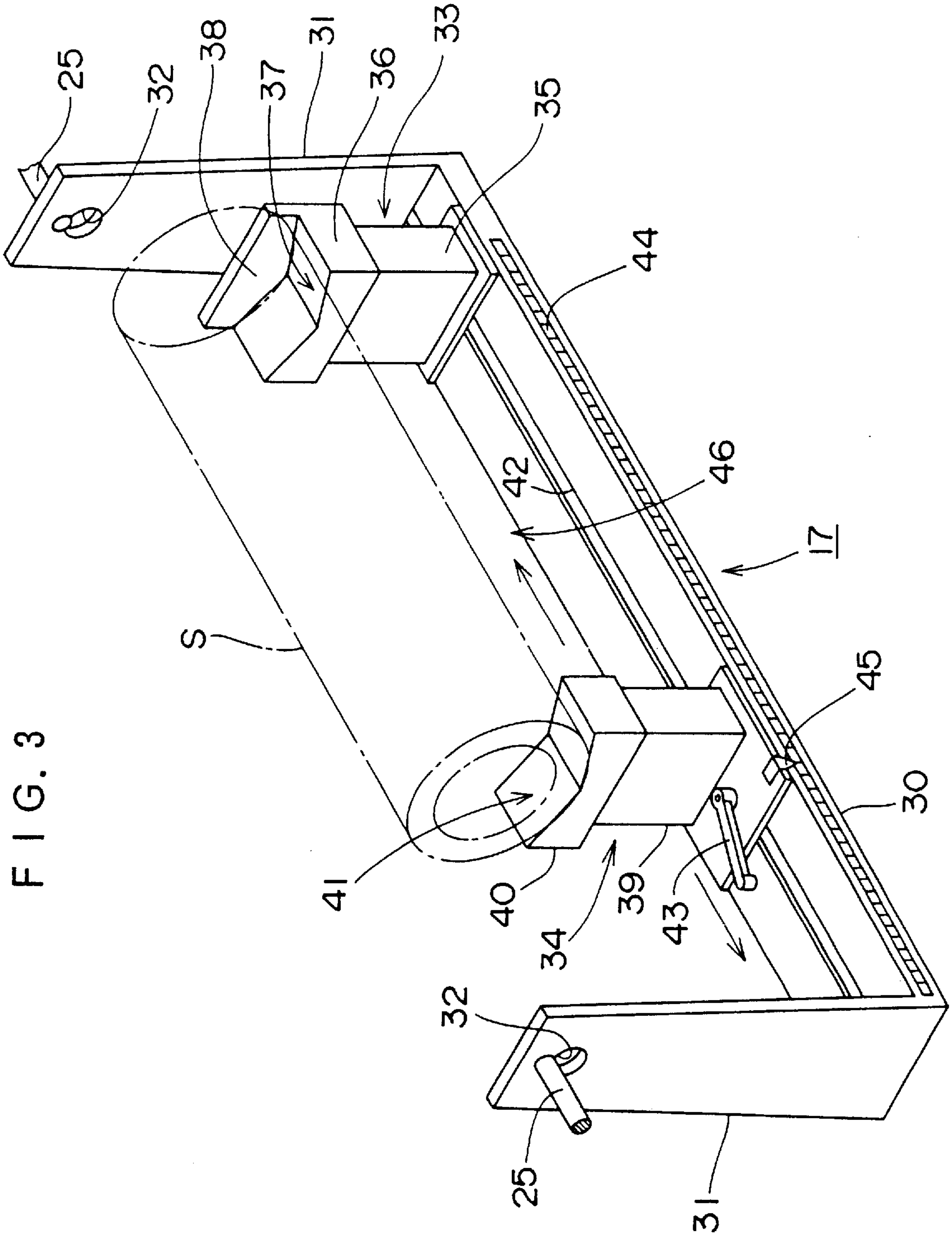
FIG. 3 is a perspective view of a specific example of the arrangement of a placing stand.

Now referring more particularly to FIG. 3, placing stand 17 is constituted by a horizontally disposed slender pallet 30, and two upwardly extending hanging plates 31 respectively attached to both ends of the pallet 30. Each of the hanging plates 31 is provided at the upper end thereof with an engagement hole 32. When hanging pins 25 are inserted in the engagement holes 32, the placing stand 17 is swingingly hung from the chains 20.

The pallet 30 is provided for example at its right end when viewed from the front-side, with a stationary holding portion 33. Disposed at the left side with respect to the stationary holding portion 33 is a movable holding portion 34 which is movable along the pallet 30 in the lengthwise direction thereof.

The stationary holding portion 33 has a leg 35 of which lower end is secured to the pallet 30, and a support stand 36 attached to the upper end of the leg 35. The top surface of the support stand 36 serves as a support surface 37 of which center portion is downwardly concave substantially in a V shape in side elevation. The right end of the gravure cylinder S is placed on the support surface 37 as shown by a chain line. The support stand 36 is provided at the right end thereof with a regulating plate 38 for regulating the position of the right end of the gravure cylinder S to be supported. The position of the regulating plate 38 is recognized as a first reference position at the time when the gravure cylinder length is measured as will be discussed later.

The movable holding portion 34 is constituted by a leg 39 and a support stand 40 attached to the top of the leg 39. Analogous to the support stand 36, the support stand 40 has a support surface 41 of which center portion is concave substantially in a V shape in side elevation. The left end of the gravure cylinder is placed on the support surface 41.

The underside of the leg 39 of the movable holding portion 34 is transversely movably attached to the top surface of the pallet 30. More specifically, the pallet 30 is provided in the top surface thereof with a guide groove 42 extending in the lengthwise direction of the pallet 30. The leg 39 is provided at the lower end thereof with a small projection (not shown) engaged with the guide groove 42. By the engagement of the small projection with the guide groove 42, the movable holding portion 34 slides transversely on the pallet 30 without coming off from the pallet 30.

Further, the movable holding portion 34 has a lever 43 for switching the movable holding portion 34 between the stationary state and the movable state. For example, when the lever 43 is positioned as shown in FIG. 3, a fitting portion (not shown) of the lever 43 pushes the guide groove 42 in the pallet 30 to fix the movable holding portion 34 such that the same cannot be moved. On the other hand, when the lever 43 is rotated, pushing the guide groove 42 by the fitting portion (not shown) is released such that the movable holding portion 34 is transversely movable on the pallet 30. Provision is made such that in use, the distance between the stationary holding portion 33 and the movable holding portion 34 is suited to the length of the gravure cylinder S.

In this embodiment, a scale 44 is attached to the front end surface of the pallet 30 for the convenience of usage. Further, an indication pointer 45 is disposed on the movable holding portion 34. Thus, the distance between the stationary and movable holding portions 33 and 34 is expressed by the division that the indication pointer 45 indicates.

As shown in FIG. 3, when the gravure cylinder S is supported at both ends thereof by the stationary and movable holding portions 33 and 34, the gravure cylinder S is positioned such that the axis thereof extends substantially horizontally (that is, the gravure cylinder S lies down). In this state, there is formed, under the gravure cylinder S, a space 46 into which arm units, to be described later, can be entered. Each of the legs 35 and 39 has a predetermined height, accordingly.

Arrangement of the Transport Device 2

Referring again to FIGS. 1 and 2, the transport device 2 is disposed between the stocker 1 and the engraving machine 3 for transporting a gravure cylinder S from the stocker 1 to the engraving machine 3 and for transporting gravure cylinder S to engraving machine 3 after cylinder S is engraved by machine 3.

The transport device 2 is constituted by a frame 50 forming the skeletal structure thereof, a right arm unit 51 serving as a first arm and a left arm unit 52 serving as a second arm, both arm units 51 and 52 being attached to the frame 50. Each of the right and left arm units 51 and 52 is movable in a vertical direction and in a back-and-forth direction when viewed from the front side of the system (in the transverse direction in FIG. 1). Further, the left arm unit 52 is movable transversely in FIG. 2 with respect to the frame 50.

Arrangement of the Arm Units 51 and 52

Figure 4:
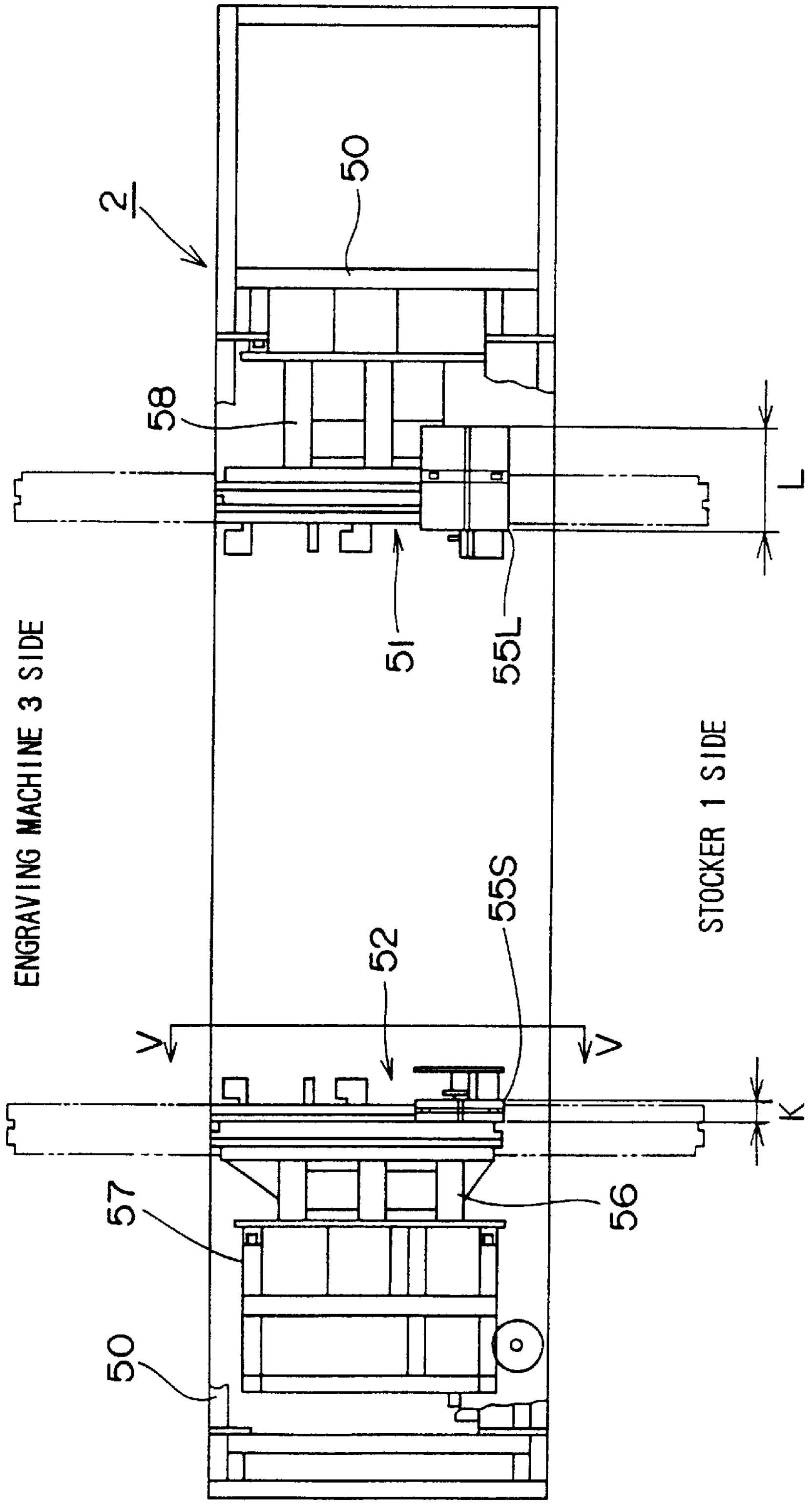
FIG. 4 is a plan view of the transport device.
Figure 5:
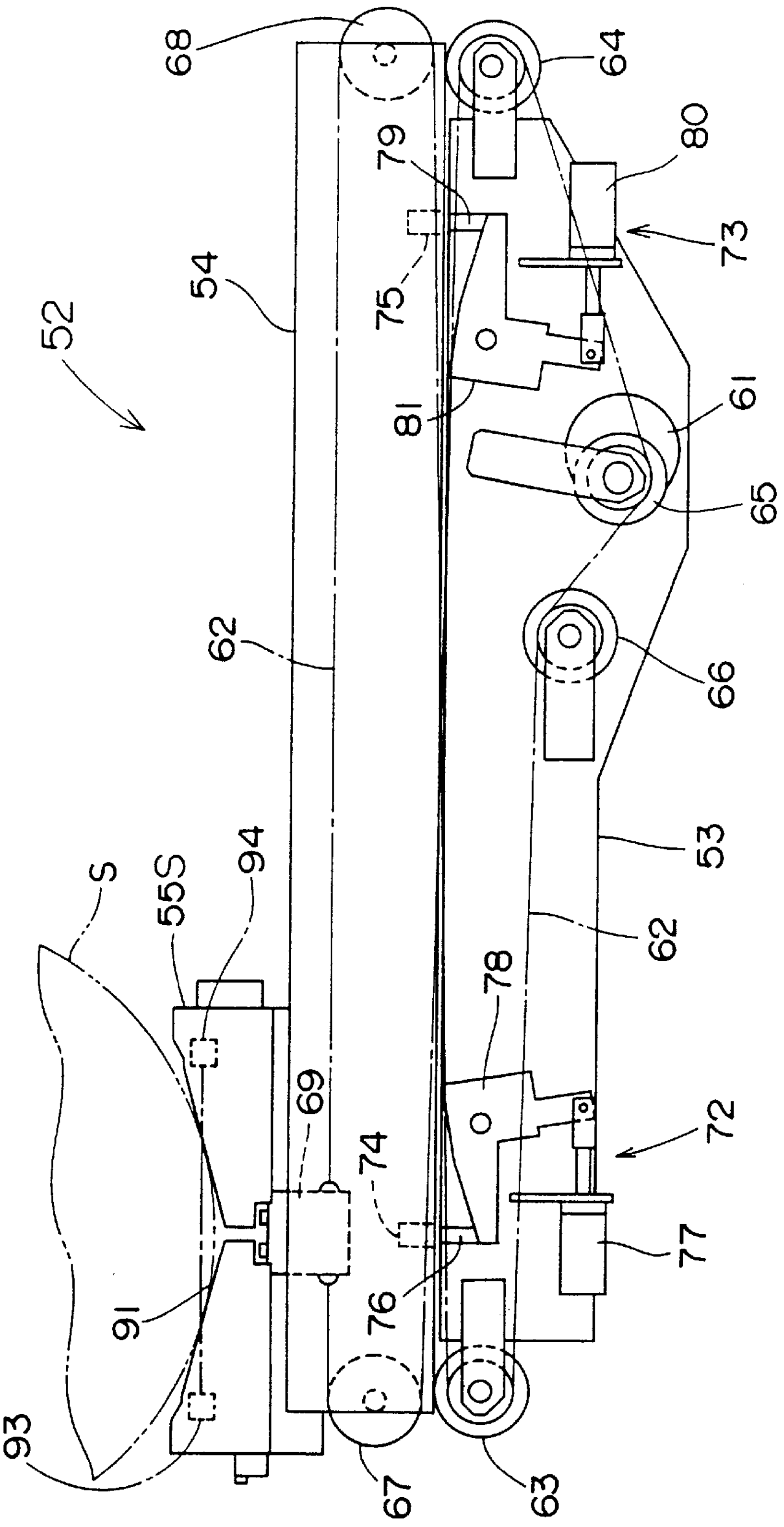
FIG. 5 is a side view of the left arm unit taken along the line V—V in FIG. 4.
Figure 6:
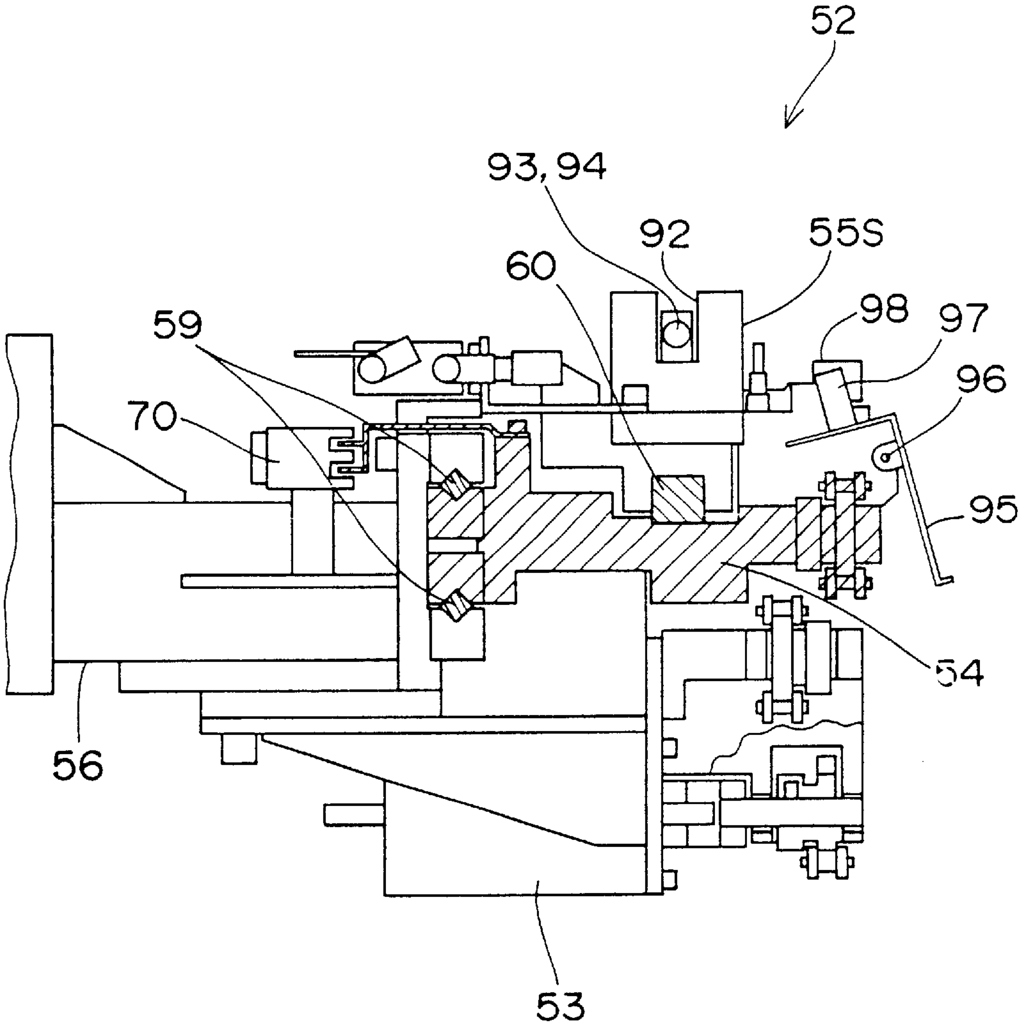
FIG. 6 is a front view of the left arm unit.

Now referring more particularly to FIGS. 4–6, two-dot chain lines shown in FIG. 4 in connection with the right and left arm units 51 and 52 illustrate the movable ranges of the arm units 51 and 52 in the horizontal transport direction when a gravure cylinder S is transported.

Left arm unit 52 is constituted by an arm base member 53, a slide arm member 54 and a support block 55S. The arm base member 53 is attached to a moving frame 57 by a coupling member 56. The moving frame 57 is movable transversely in FIG. 4 with respect to the frame 50 serving as the general skeletal structure of the transport device 2. Accordingly, when the moving frame 57 is moved transversely in FIG. 4, the left arm unit 52 is also moved transversely.

On the other hand, in the right arm unit 51, the arm base member is attached to the frame 50 by a coupling member 58. The right arm unit 51 is different in this point from the left arm unit 52.

The right and left arm units 51 and 52 have support blocks 55L and 55S, respectively. The support blocks 55L and 55S are formed for placing a gravure cylinder thereon such that the gravure cylinder is transported as supported by these support blocks 55L and 55S.

Each of the support blocks 55L and 55S has, as a common arrangement, a mounting surface (gravure cylinder placing and supporting surface) 91 of which center portion is downwardly concave substantially in a V shape in side elevation. Thus, a gravure cylinder S is to be placed on the mounting surfaces 91.

The support blocks 55L and 55S are structurally different in the width of mounting surface 91. More specifically, the mounting surface 91 of the support block 55L has a width L, while the mounting surface 91 of the support block 55S has a width K. The widths of the mounting surfaces 91 have the following relationship:

$$L>K.$$

The following will discuss the reasons why the mounting surfaces 91 are different in width.

Figure 7A:
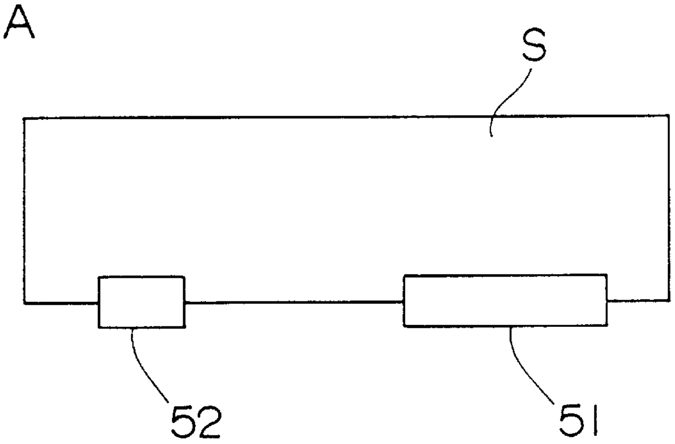
FIG. 7A and FIG. 7B are schematics illustrating respectively a both-hand holding state where a gravure cylinder is held by two arm units, i.e., the right and left arm units, and a one-hand holding state where a gravure cylinder is held only by the right arm unit.

Generally, a gravure cylinder S is supported by two support blocks, i.e., the support blocks 55L and 55S of the right and left arm units 51 and 52, as shown in FIG. 7A.

However, when the length of a gravure cylinder S is short, the gravure cylinder can be supported, with difficulty, by the two support blocks 55L and 55S. For example, when the length of a gravure cylinder S is short, the gravure cylinder S is held on the placing stand 17 shown in FIG. 3 with the distance between the stationary and movable holding portions 33 and 34 shortened. This narrows the width of the space 46 under the gravure cylinder S thus held. This may make it difficult to simultaneously insert both arm units 51 and 52 into the narrow space 46 at the same time.

Figure 7B:
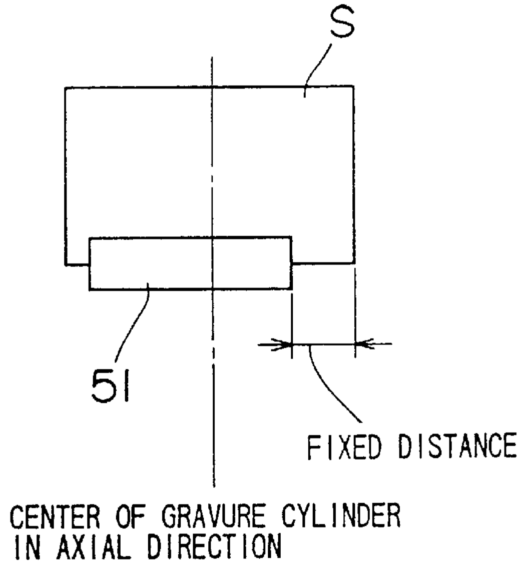

Thus, provision is made such that a short gravure cylinder can be transported as held at the vicinity of the center thereof only by the support block 55L of the right arm unit 51 as shown in FIG. 7B.

Except for the foregoing difference, the right and left arm units 51 and 52 are the same in arrangement. Accordingly, the following description will be made with the left arm unit 52 taken as an example.

Mainly referring to FIGS. 5 and 6, the slide arm member 54 is coupled to the arm base member 53 in a manner slidable thereon in the back-and-forth direction (at the time when the whole system is viewed from the front side; in the transverse direction in FIG. 5). More specifically, the arm base member 53 and the slide arm member 54 are slidably coupled to each other through slide guides 59 (FIG. 6). The support block 55S is coupled to the slide arm member 54 in a manner slidable in the back-and forth-direction along the top surface of the slide arm member 54. More specifically, the slide arm member 54 and the support block 55S are coupled to each other through a slide guide 60. Accordingly, when viewed as a function of the arm base member 53 secured by the coupling member 56, the slide arm member 54 is slidable on the arm base member 53, and the support block 55S is slidable on the slide arm member 54. For purpose of illustration in FIG. 6, the slide arm member 54 is generally hatched and the slide guides 59 and 60 are also hatched, but in a different manner than the hatching used for arm member 54.

Mainly referring to FIG. 5, the slide arm member 54 and the support block 55S are simultaneously driven by a single motor 61 and a single chain 62. In this connection, the following mechanism is provided.

Gears 63 and 64 are rotatably disposed at the front and rear ends of the arm base member 53. The motor 61 and a drive gear 65 to be rotated by the motor 61 are disposed substantially at the center part of the arm base member 53 at its lower side. In the arm base member 53, a tension adjust gear 66 is further disposed in the vicinity of the drive gear 65. Gears 67 and 68 are rotatably disposed at the front and rear ends of the slide arm member 54. It is noted that the gears 63, 64, 67, and 68 may be disposed in the vicinity of the front and rear ends, and it is not always required that the gears 63, 64, 67, and 68 be disposed at the front and rear ends.

The chain 62, shown by a chain line for shortness' sake, has one end coupled to a mounting piece 69 disposed at the support block 55S. The chain 62 is installed on the gear 67 disposed at the slide arm member 54, then on the gear 64 disposed at the arm base member 53, and then on the drive gear 65. The chain 62 is adjusted in tension by the tension adjust gear 66 and installed on the gear 63 of the arm base member 53 and on the gear 68 of the slide arm member 54. The chain 62 has the other end coupled to the mounting piece 69 of the support block 55S. That is, the chain 62 is so installed as to cross near the boundary between the arm base member 53 and the slide arm member 54, such that the chain 62 is generally installed in the shape of the figure "8".

This embodiment is arranged such that the slide arm member 54 and the support block 55S are driven by the motor 61 and the chain 62. However, a belt such as a timing belt or the like may be used instead of the chain 62. In such a case, belt pulleys may substitute for the gears 63, 64, and 65 disposed at the arm base member 53 and the gears 67 and 68 disposed at the slide arm member 54.

Thus, winding wheels such as gears, pulleys or the like are disposed in the vicinity of the front and rear ends of the arm members. An endless coupling body such as a chain, a belt or the like is installed on the winding wheels in the shape of the figure "8", and portions of the coupling body are fixed to the support block. By disposing a driving mechanism for circularly moving the coupling body, the slide arm member 54 and the support block 55S can be driven.

In the embodiment described with reference to attached drawings, there has been discussed the arrangement in which the motor 61 and the drive gear 65 are disposed as associated with the arm base member 53. However, the motor 61 and the drive gear 65 may be disposed as associated with the slide arm member 54.

To regulate the operation of the slide arm member 54, pin units 72 and 73 are disposed at or in the vicinity of the front and rear ends of the arm base member 53. The slide arm member 54 provided in the front and rear end portions thereof with engagement holes 74 and 75 to receive respective pins 76 and 79 of the pin units 72 and 73, respectively. In their projecting states pins 76 and 79 project above base member 53 into respective holes 74 and 75.

The pin unit 72 is also constituted by an air cylinder 77 for switching the pin 76 between the projecting state and the non-projecting state, and a link 78 for transmitting the operation of the air cylinder 77 to the pin 76. Likewise, the pin unit 73 is also constituted by an air cylinder 80, a link 81 driven by cylinder 81 and drives pin 79 between its projecting and on-projecting (retracted) states.

Figure 5A:
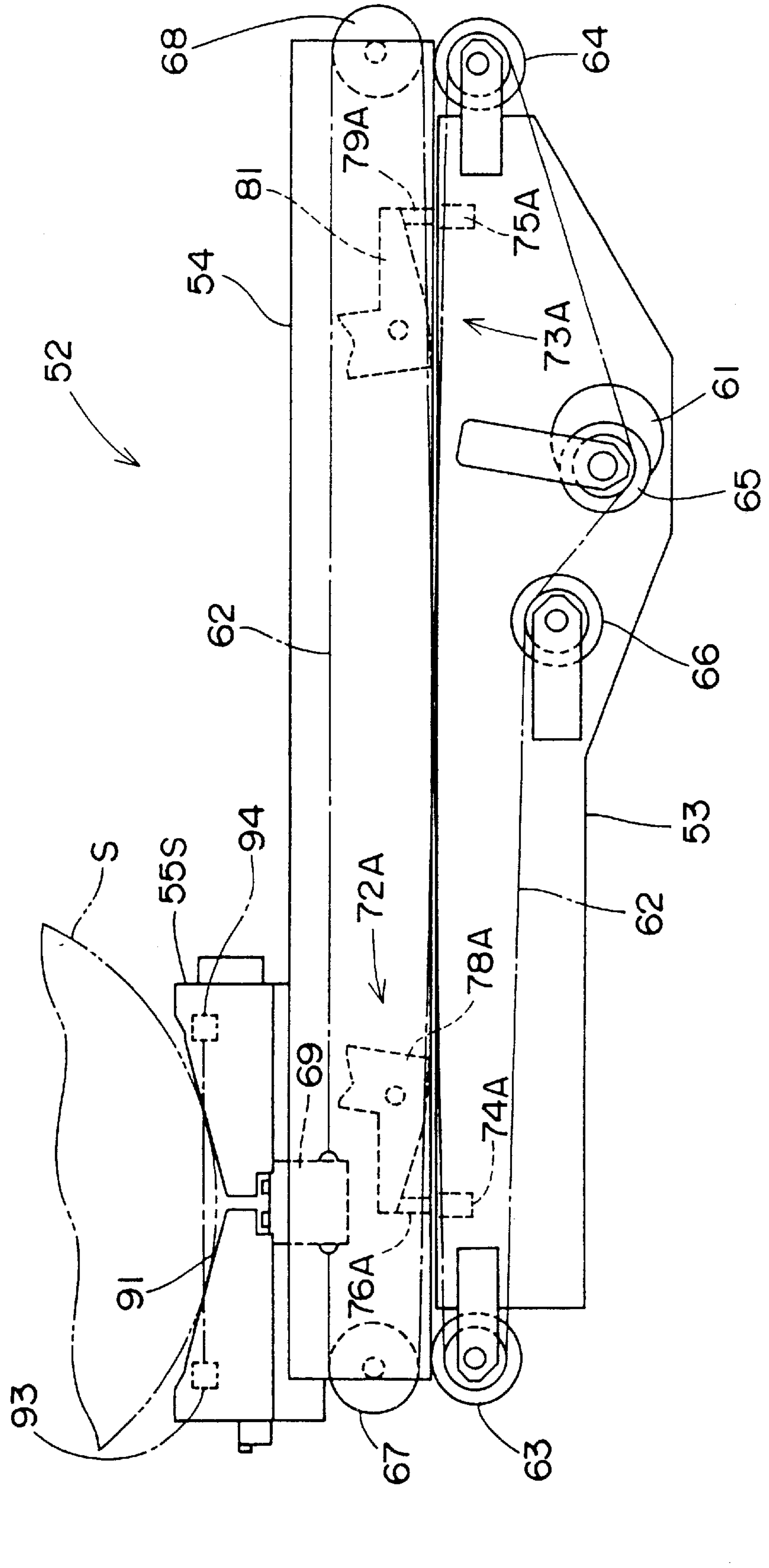
FIG. 5A is a side view of another example of the left arm unit.

Instead of the arrangement above-mentioned, as shown in FIG. 5A, the pin units 72A and 73A may be disposed at predetermined positions of the slide arm member 54 in the vicinity of the front and rear ends thereof, and the engagement holes 74A and 75A respectively corresponding to the pins 76A and 79A of the pin units 72A and 73A may be formed in predetermined positions of the arm base member 53 in the vicinity of the front and rear ends thereof.

Figure 8:
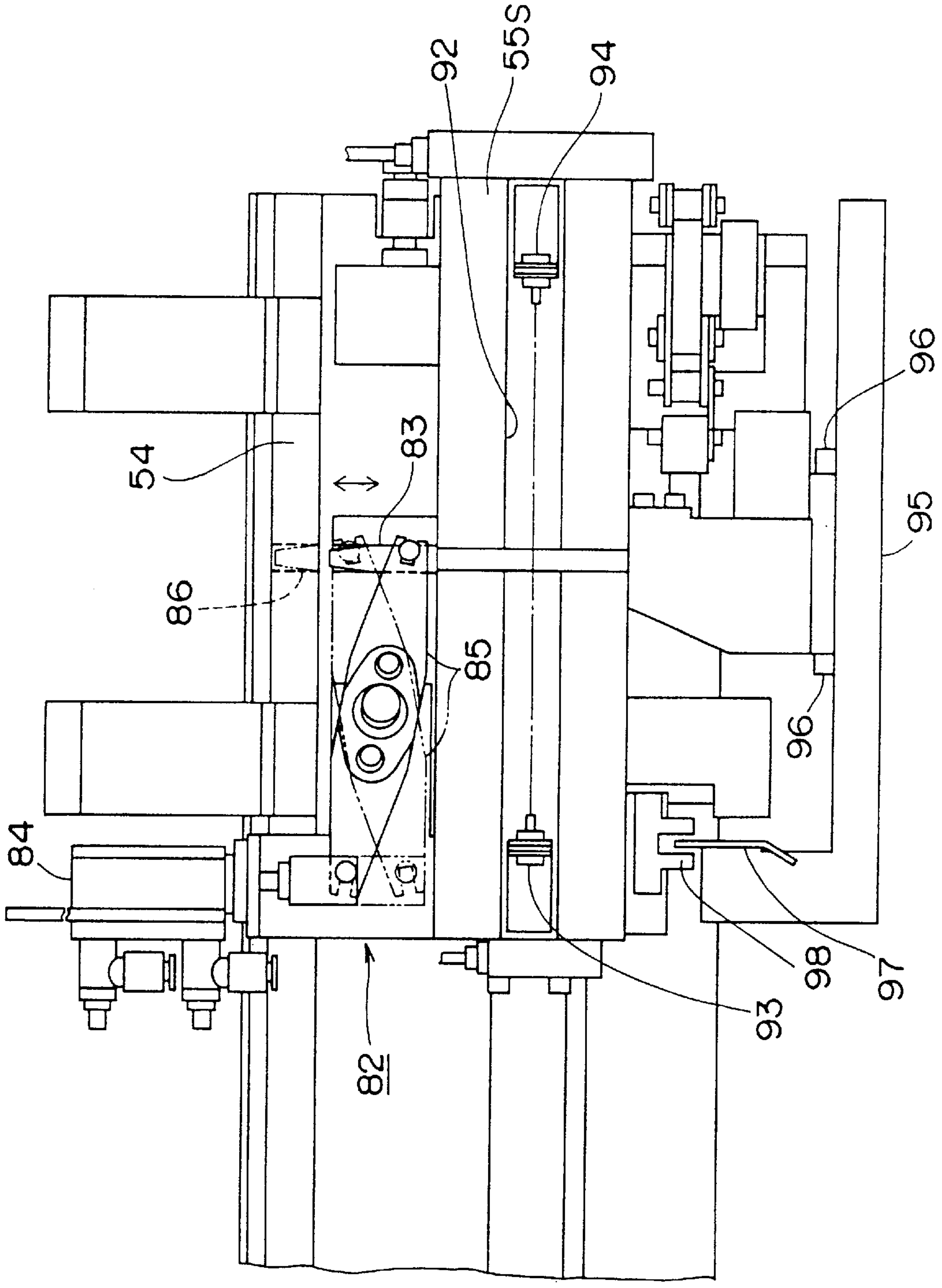
FIG. 8 is a plan view illustrating the relationship between the pin unit and the engagement hole of a support block.

Further, a pin unit is disposed at the support block 55S for regulating the operation of the support block 55S on the slide arm member 54, and a hole for receiving a pin is formed in the slide arm member 54. FIG. 8 shows this arrangement.

Referring to FIG. 8, a pin unit 82 disposed at the support block 55S is constituted by a pin 83 which can laterally project from the support block 55S, an air cylinder 84 for driving the pin 83, and a link 85 for transmitting the movement of the air cylinder 84 to the pin 83. When the support block 55S is located in a predetermined position, an engagement hole 86 formed in the slide arm member 54 is located in a position opposite to the pin 83. At this state, when the air cylinder 84 is driven, the pin 83 enters the engagement hole 86 to fix the support block 55S such that the same cannot be moved with respect to the slide arm member 54.

Figure 9A:
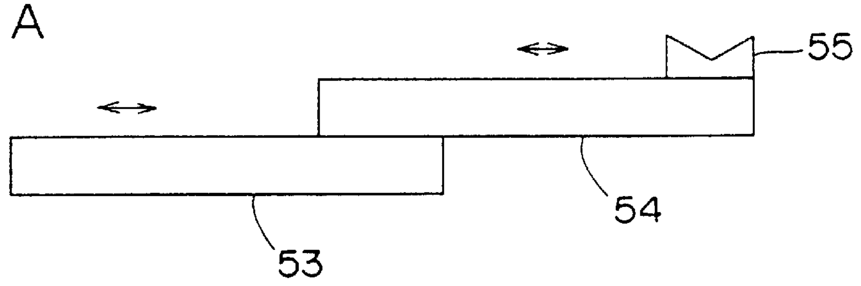
FIG. 9A, FIG. 9B and FIG. 9C are schematics illustrating the characteristic arrangement of an arm unit.
Figure 9B:
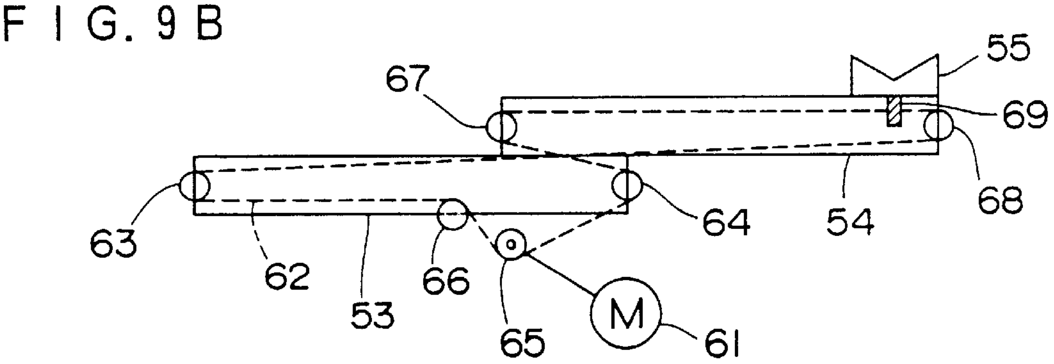
Figure 9C:
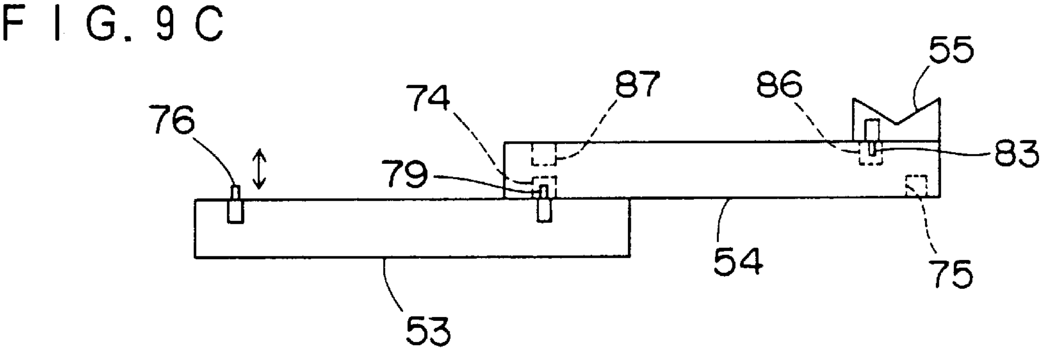

FIGS. 9A, 9B, and 9C are schematics illustrating the characteristic structure of the arm unit above-mentioned. The right arm unit 51 and the left arm unit 52 have the same characteristic structure. Accordingly, without making distinctions between the right arm unit 51 and the left arm unit 52, the following description will briefly summarize the structural characteristics of an arm unit indicative of each of the right and left arm units.

As shown in FIG. 9A, the arm unit is divided into three blocks, i.e., the arm base member 53, the slide arm member 54 slidable on the arm base member 53, and the support block 55 slidable on the slide arm member 54. The slide arm member 54 and the support block 55 are driven by a common motor and a common chain. Thus, there is disposed a mechanism that appears in FIGS. 9B and 9C.

That is in FIG. 9B, the arm base member 53 and the slide arm member 54 are illustrated as mounting gears 63 to 68, and the chain 62 is illustrated as being installed on the members 53 and 54 in the shape of the figure "8". Both the ends of the chain 62 are connected to the mounting piece 69 disposed at the support block 55. The chain 62 is moved by the drive gear 65 driven by the motor 61.

All three pins 76, 79, and 83 appear in FIG. 9C. The pins 76 and 79 are respectively disposed at the front and rear sides of the arm base member 53, and the pin 83 is disposed at the support block 55. Formed in the slide arm member 54 are the engagement holes 74, 75, 86, and 87 which can receive the pins 76, 79, and 83.

Back-and-Forth Movement of the Arm Units 51 and 52

With reference to FIG. 10A to FIG. 10D and FIG. 11A to FIG. 11D, the following description will discuss the operation of the arm units each having the arrangement above-mentioned.

Figure 10A:
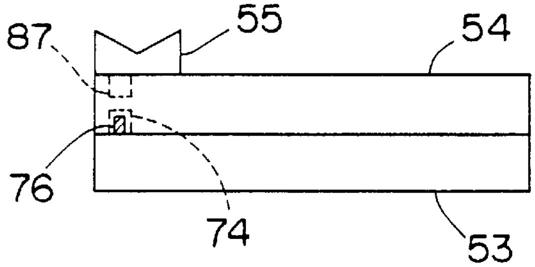
FIG. 10A to FIG. 10D are schematics illustrating operation of an arm unit.

Referring particularly to FIG. 10A to FIG. 10D, the following description will discuss the operation of each arm unit for moving the support block 55 from the center (10B) to the front or left side (FIG. 10*a*), and (to the rear or right side in FIG. 10A to FIG. 10D). As shown in FIG. 10A, with the pin 83 withdrawn into the support block 55, the pin 76 at the front side of the arm base member 53 is projected and entered into the front engagement hole 74 in the slide arm member 54.

Figure 10B:
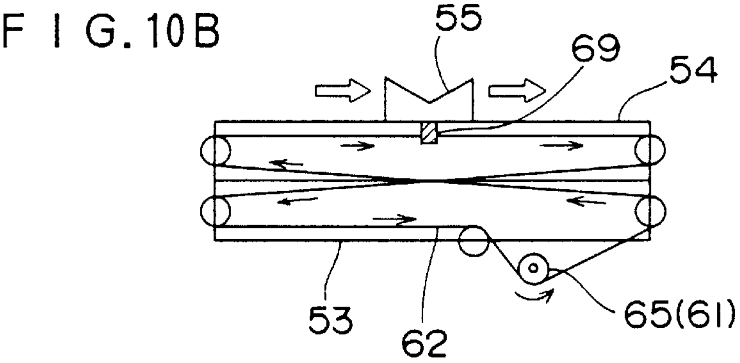

At this state, the motor 61 is rotated counterclockwise. As shown in FIG. 10B, only the support block 55 is moved as pulled by the movement of the chain 62. At this time, the slide arm member 54 is fixed by the pin 76 and therefore not movable.

Figure 10C:
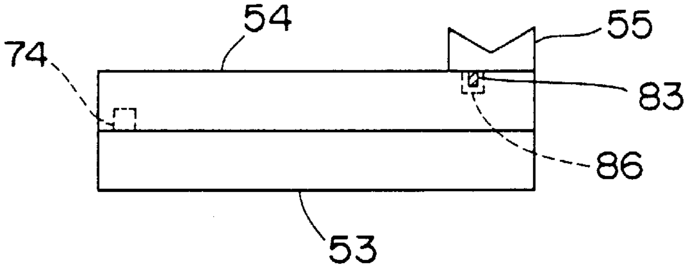

Referring to FIG. 10C, it is detected that the support block 55 has reached the rear end (the right end in FIG. 10C) of the slide arm member 54. For example, such detection can be made by a microswitch disposed at the rear end of the slide arm member 54. Alternatively, if the motor 61 is a step motor or a motor with an encoder, such detection can be made by counting the number of rotational pulses of the motor.

When this detection is made, the pin 83 of the support block 55 is inserted into the rear engagement hole 86 of the slide arm member 54 to fix the support block 55 to the rear end of the slide arm member 54. On the other hand, the front pin 76 of the arm base member 53 is retracted such that the slide arm member 54 is movable.

Figure 10D:
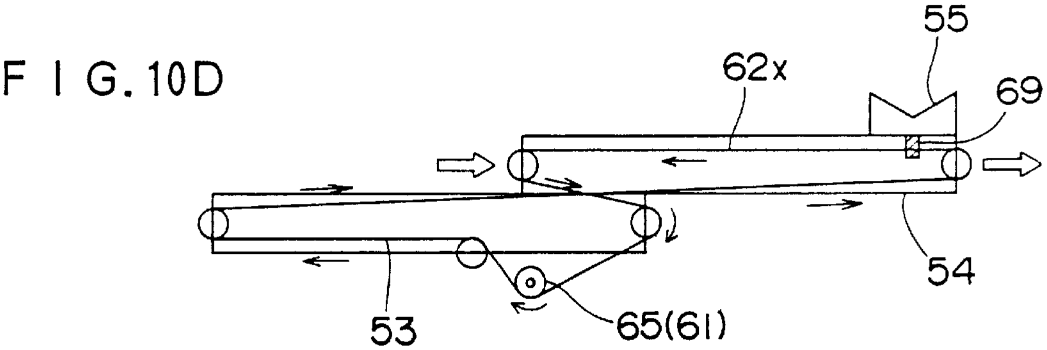

At this state, the motor 61 is rotated clockwise. As shown in FIG. 10D, the length of the chain portion 62*x* between the mounting piece 69 of the support block 55 and the drive gear 65 is rapidly shortened and the slide arm member 54 is slid rearward. The rearward movement of the slide arm member 54 causes the support block 55 to be moved rearward with respect to arm base member 53.

Likewise in the support block 55 above-mentioned, it can be detected by a switch or based on the number of pulses given to the motor 61 that the slide arm member 54 has moved up to the rear end. An example of the switch is shown in FIG. 6 and designated by a reference numeral 70.

With reference to FIG. 11A to FIG. 11D, the following description will explain a situation where the support block 55 is moved from the rear end (the right end in FIG. 11A to FIG. 11D) toward the front end (the left end in FIG. 11A to FIG. 11D).

First, the pin 83 of the support block 55 is retracted, causing the support block 55 to be movable with respect to the slide arm member 54. On the other hand, the pin 79 at the rear end of the arm base member 53 is projected and entered into the forward engagement hole 74 in the slide arm member 54 to fix the same.

Figure 11A:
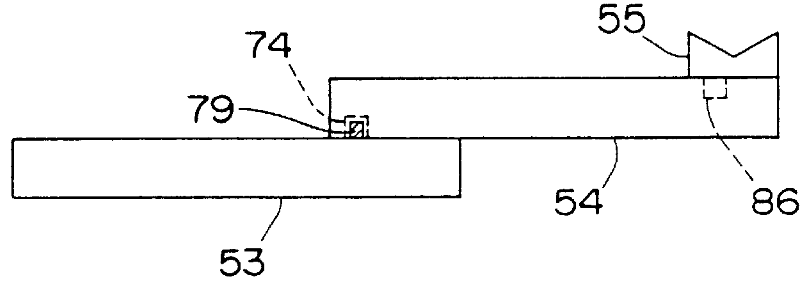
FIG. 11A to FIG. 11D are additional schematics illustrating operation of the arm unit.
Figure 11B:
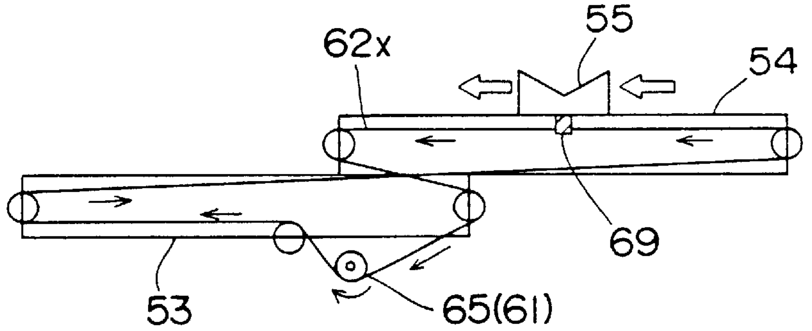

At this state, the motor 61 is rotated clockwise as shown in FIG. 11B. Then, the length of the chain portion 62*x* between the mounting piece 69 and the drive gear 65 is rapidly shortened, causing the support block 55 to slide forwardly on the slide arm member 54.

Figure 11C:
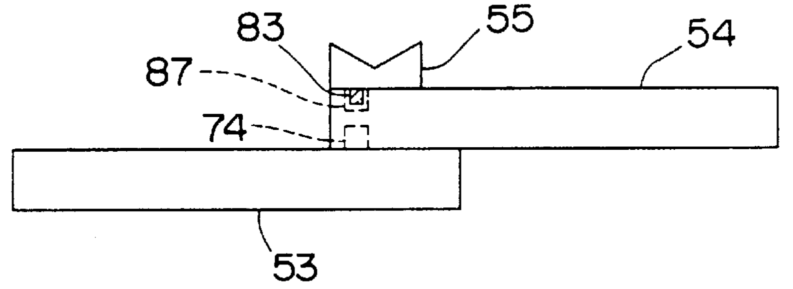

Whether or not the support block 55 has reached the front end of the slide arm member 4 as shown in FIG. 11C, is detected by a sensor such as a microswitch or the like or based on the number of rotational pulses of a motor. At this state, the pin 83 of the support block 55 is projected and entered into the forward engagement hole 87 in the slide arm member 54 to fix the support block 55. On the other hand, the pin 79 of the arm base member 53 is retracted, causing the slide arm member 54 to be movable with respect to the arm base member 53.

Figure 11D:
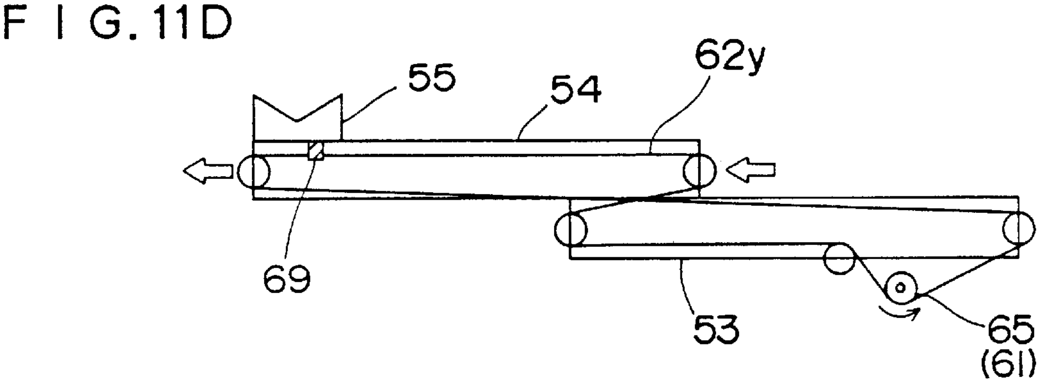

Now motor 61 is rotated counterclockwise as shown in FIG. 11D. Then, the length of the chain portion 62*y* between the mounting piece 69 and the drive gear 65 is shortened rapidly, causing the slide arm member 54 to be moved forwardly on the arm base member 53.

According to the arrangement above-mentioned, even in a compact design the arm unit has a long transport length. Further, using a chain and pins, the slide arm member 54 and the support block 55 can be driven by a single motor (e.g., pulse motor).

Provision is made such that the right arm unit 51 and the left arm unit 52 are driven individually. More specifically, each of the right arm unit 51 and the left arm unit 52 is provided with a drive motor. For synchronously driving the right arm unit 51 and the left arm unit 52 at the same time, the same pulse is entered into the drive motors.

However, provision is preferably made such that, in view of the possible occurrence of some change in load to produce a difference in movement between the right and left arm units 51 and 52, such a difference is detected by a sensor or the like. Also, provision is preferably made such that the movements of the arm units 51 and 52 are changed or stopped by an output of the sensor.

When the whole system is viewed from the front side, the right arm unit 51 and the left arm unit 52 move not only in the back-and-forth direction, but also in the up-and-down direction as mentioned earlier. That is, when unloading a gravure cylinder S from the placing stand 17, when placing a gravure cylinder S on the placing stand 17, when mounting a gravure cylinder S on the engraving machine 3 or when retrieving a mounted gravure cylinder S such that the same gets out of the way, the right arm unit 51 and the left arm unit 52 are required to move vertically.

As above mentioned, the left arm unit 52 is transversely movable when the whole system is viewed from the front side. Thus, the distance between the left arm unit 52 and the right arm unit 51 can be optimized for holding a gravure cylinder S according to the length thereof.

The following description will discuss the vertical movements of the right and left arm units 51 and 52 and the transverse movement of the left arm unit 52.

Figure 12:
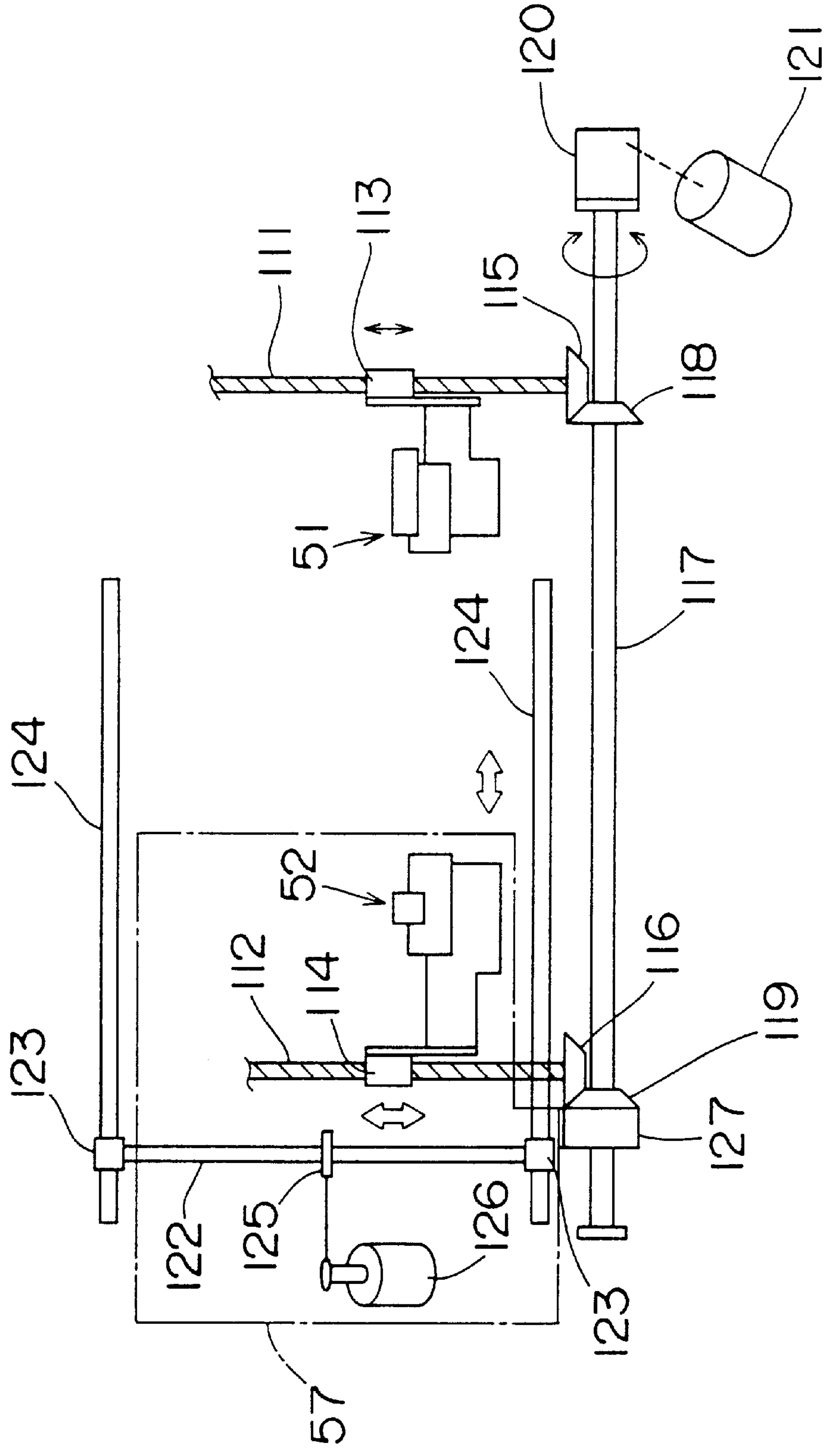
FIG. 12 is a schematic illustrating drive mechanisms for vertically and transversely moving the arm units in the transport device.

Vertical and Transverse Movements of the Arm Units 51 and 52 and Moving Mechanisms The drive mechanisms (FIG. 12) for vertically and transversely moving the arm units 51 and 52 include internally threaded members 113 and 114, with balls, respectively fitted to vertically disposed screw shafts 111 and 112, and the latter are respectively fitted to the right and left arm units 51 and 52. Accordingly, when the screw shafts 111 and 112 are rotated, the member 113 and the right arm unit 51 fitted thereto, and the member 114 and the left arm unit 52 fitted thereto, are vertically moved along the screw shafts 111 and 112, respectively. The screw shafts 111 and 112 are respectively provided at the lower ends thereof with bevel gears 115 and 116.

A horizontally extending spline shaft 117 is disposed at a lower portion of the transport device 2. Mounted on the spline shaft 117 are bevel gears 118 and 119 meshed with the respective bevel gears 115 and 116. Of these, the right-hand bevel gear 118 is so fixed to the spline shaft 117 as not to be transversely displaced with respect thereto. The left-hand bevel gear 119 is transversely movable along the spline shaft 117. An L-shape gear 120 is attached to one end of the spline shaft 117, which is connected to a motor 121 through the L-shape gear 120.

According to the arrangement above-mentioned, when the motor 121 is rotated, its rotational force is transmitted to the spline shaft 117 through the L-shape gear 120, causing the spline shaft 117 to be rotated. When the spline shaft 117 is rotated, the bevel gear 118 is also rotated. The rotational force of the bevel gear 118 is transmitted to the bevel gear 115, causing the screw shaft 111 to be rotated. When the screw shaft 111 is rotated, the internally threaded member 113 is vertically moved along the screw shaft 111. At the same time, the right arm unit 51 fitted to the member 113 is also vertically moved. Whether the right arm unit 51 is moved up or down, is determined by the rotational direction of the screw shaft 111, i.e., the rotational direction of the motor 121 for rotating the spline shaft 117.

When the spline shaft 117 is rotated, the left-hand bevel gear 119 is also rotated. The rotational force of the bevel gear 119 is transmitted to the bevel gear 116 meshed therewith, causing the screw shaft 112 to be rotated. When the screw shaft 112 is rotated, the internally threaded member 114 is vertically moved. Then, the left arm unit 52 fitted to the member 114 is also vertically moved together with the movement of the internal thread 114.

The screw shafts 111 and 112 are rotated by the bevel gears 118 and 119 attached to the common spline shaft 117. Accordingly, when the bevel gears 118 and 119 have in the number of teeth and pitch, the right and the same left arm units 51 and 52 can be moved vertically by the same amount at the same time.

To smooth the vertical movement of the right and left arm units 51 and 52, there are disposed, in parallel with the screw shafts 111 and 112, linear guides (not shown in FIG. 12) for guiding the vertical movement of the right and left arm units 51 and 52.

The following description will discuss a drive mechanism for transversely moving the left arm unit 52.

As mentioned earlier, the left arm unit 52 is attached to the moving frame 57 that has a vertically extending shaft 122. A pinion 123 is attached to each of the upper and lower ends of the shaft 122. Meanwhile, racks 124 engaged with the pinions 123 are secured to upper and lower portions of the frame of the transport device 2. The upper and lower racks 124 are so disposed as to extend horizontally. Mounted on the shaft 122 is a gear 125, to which a drive force developed by a motor 126 is applied.

A nut 127 movable along the spline shaft 117 is mounted thereon and coupled with the bevel gear 119. Thus, when the nut 127 is transversely moved along the spline shaft 117, the bevel gear 119 is also transversely moved along the spline shaft 117 with the movement of the nut 127, and the latter is coupled with the moving frame 57.

According to the arrangement above-mentioned, when the motor 126 is rotated, the rotational force causes the gear 125 to be rotated which in turn rotates shaft 122. When the shaft 122 is rotated, the pinions 123 disposed at the upper and lower ends thereof, are meshed with the racks 124 and moved therealong. The racks 124 are stationary and the moving frame 57, including the pinions 123, is transversely movable. Accordingly, when the pinions 123 are rotated, the whole moving frame 57 is moved rightwards or leftwards. When the moving frame 57 is moved, the screw shaft 112 and the bevel gear 116 included in the moving frame 57 are also moved. At the same time, the bevel gear 119 and the nut 127 coupled with the moving frame 57 are also moved along the spline shaft 117. Accordingly, the bevel gear 116 and the bevel gear 119 are transversely movable as meshed with each other.

As will be discussed with reference to FIG. 15, horizontally extending upper and lower linear guides 129 and 130 (not shown in FIG. 12) are disposed for smoothing the transverse movement of the moving frame 57.

Figure 13:
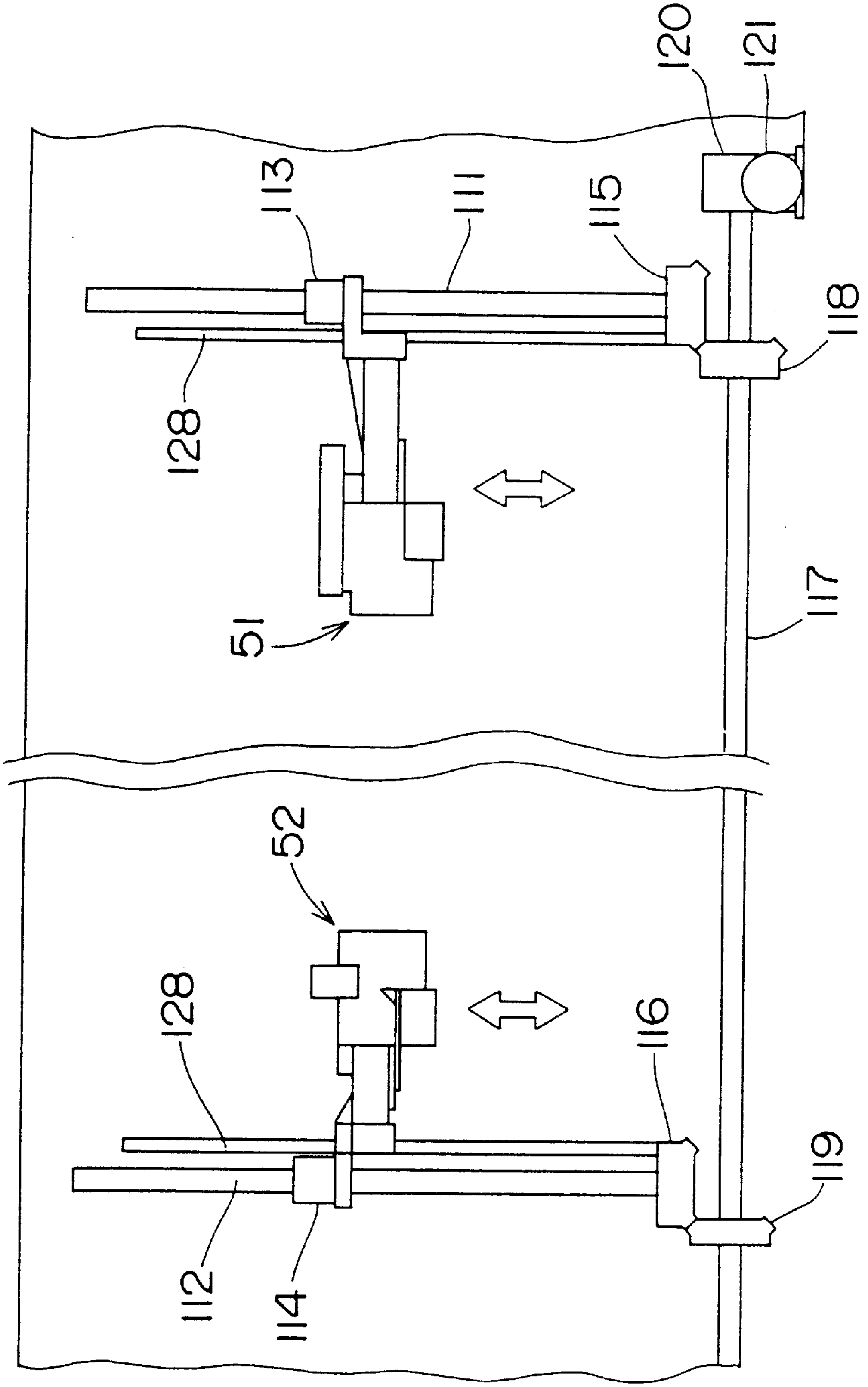
FIG. 13 is a view illustrating how the drive mechanism for vertically moving the arm units is disposed.
Figure 14:
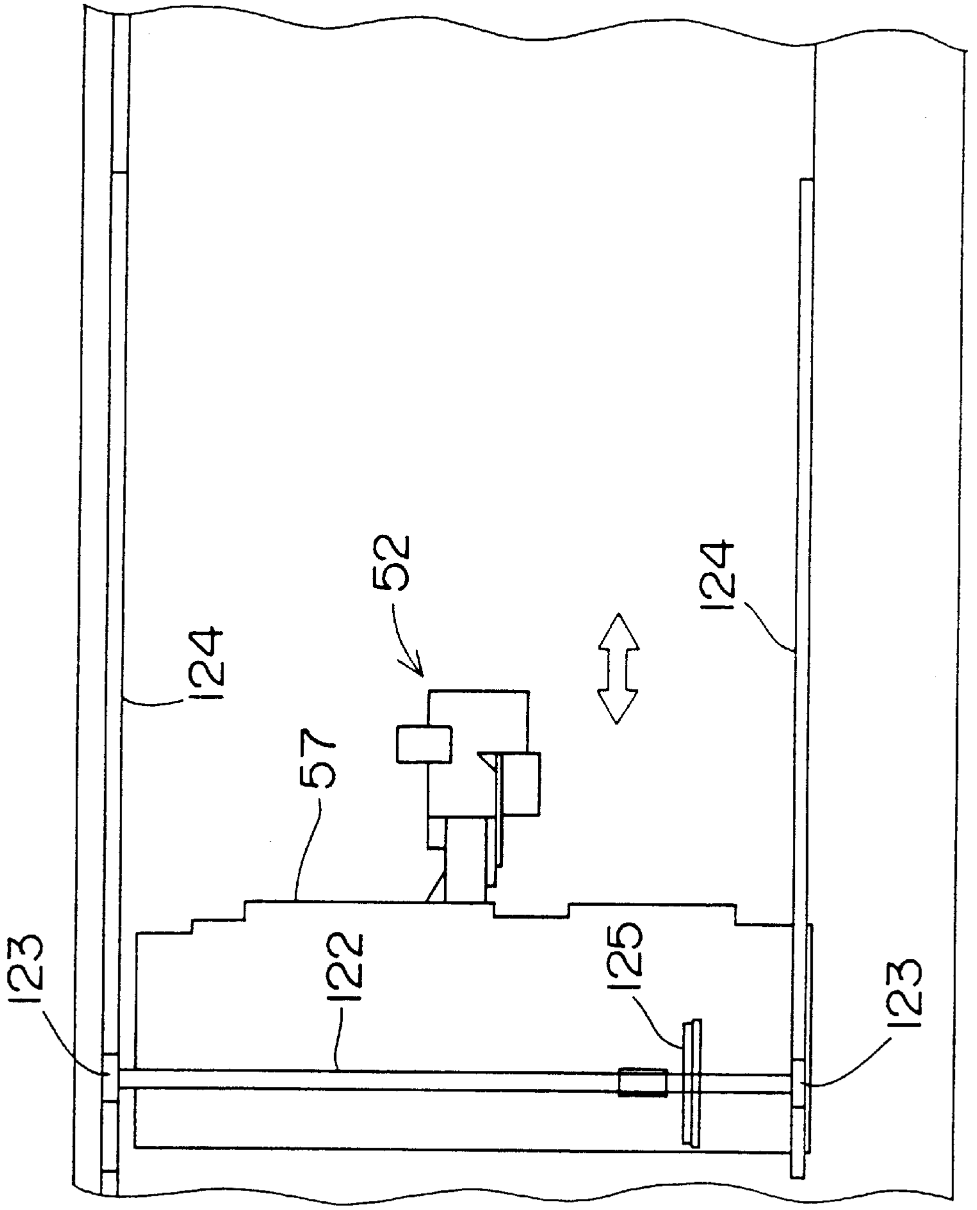
FIG. 14 is a view illustrating how the drive mechanism for the left arm unit is disposed.

FIG. 13 illustrates the arrangement of the drive mechanism for vertically moving the arm units. FIG. 14 illustrates the arrangement of the drive mechanism for the left arm unit. FIG. 15 is a right side view of the transport device 2, illustrating the arrangements of the vertically and transversely moving mechanisms of the arm units.

Figure 15:
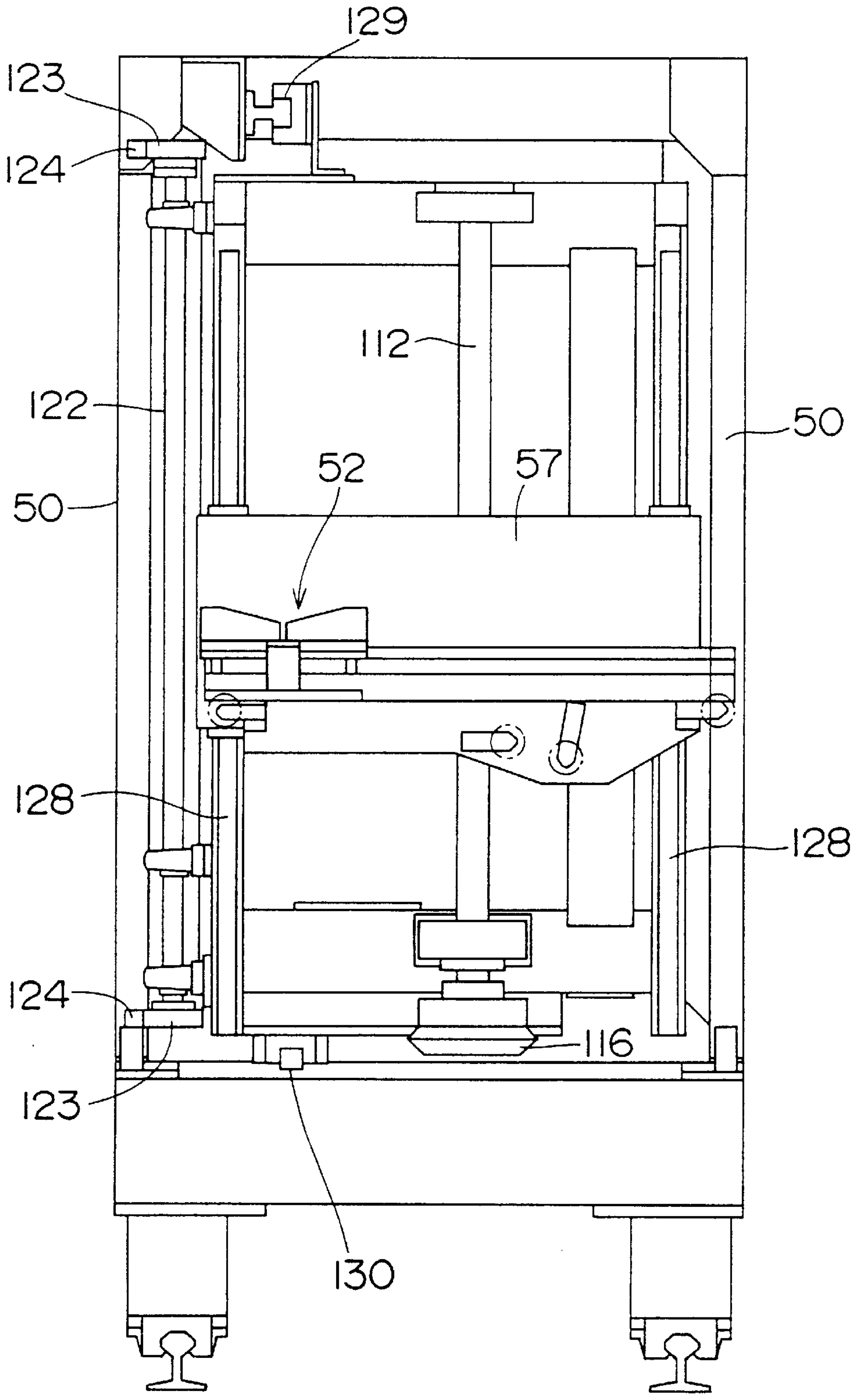
FIG. 15 is a right side view of the transport device, illustrating the arrangement of the vertically and transversely moving mechanisms for the arm units.

In FIGS. 13 to 15, there are disposed linear guides 128 for directing vertical movement. There are a total of four linear guides for vertical movement 128, i.e., front and rear there are two guides 128 for the right arm unit 51 and front and rear there are two guides 128 for the left arm unit 52. There are also an upper linear guide 129 and a lower linear guide 130. As mentioned earlier, these upper and lower linear guides 129 and 130 are disposed for smoothing the transverse movement of the moving frame 57. Other component elements designated by reference numerals used in FIGS. 13 to 15, are those already discussed. Accordingly, their shapes and layout only are shown in FIGS. 13 to 15 but detail descriptions are omitted.

Transport of Cylinder Between the Transport Device 2 and the Engraving Machine 3

Figure 16A:
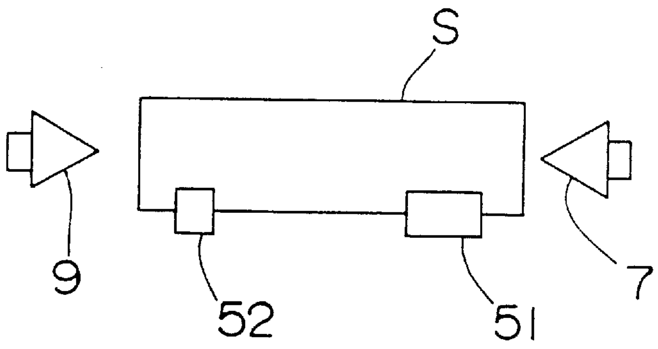
FIG. 16A to FIG. 16D are schematics illustrating how a gravure cylinder is transported between the transport device and the engraving machine.

The schematics of FIG. 16A to FIG. 16D are schematic views illustrating how to transport a gravure cylinder S between the transport device 2 and the engraving machine 3. As shown in FIG. 16A, a gravure cylinder S held by the arm units 51 and 52 of the transport device 2, is transported to a predetermined position of the engraving machine 3. At this position, the stationary cone 7 and the movable cone 9 respectively face both the end surfaces of the gravure cylinder S.

Figure 16B:
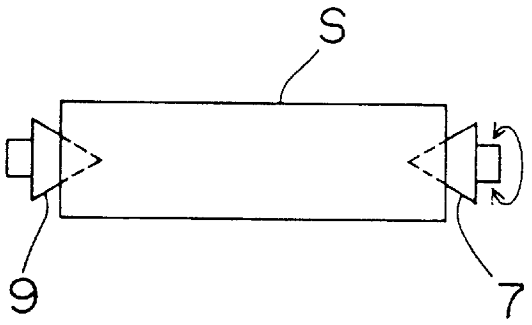

As shown in FIG. 16B, the movable cone 9 is moved rightwards into contact with the left end surface of the gravure cylinder S. As the movable cone 9 moves further to the right gravure cylinder S is pushed rightwards such that the right end surface of the gravure cylinder S is engaged with the stationary cone 7. This causes the gravure cylinder S to be supported with both its ends held by and between the cones 7 and 9. Then, the stationary cone 7 is rotated to rotate the gravure cylinder S such that the circumferential surface thereof is engraved. In this embodiment, the movable cone 9 is rotatably held and so arranged as to be rotated following the rotation of the gravure cylinder S. However, provision may be made such that the movable cone 9 is not rotated following the rotation of a gravure cylinder, but is rotated in synchronism with the stationary cone 7.

Figure 16C:
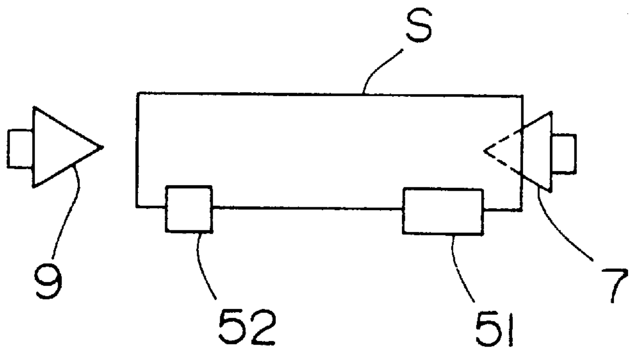

Upon completion of the engraving, the rotation of the stationary cone 7 is stopped and the gravure cylinder S is held by the arm units 51 and 52 as shown in FIG. 16C. Then, the movable cone 9 is moved leftwards and clears the left end surface of the gravure cylinder S.

To separate the gravure cylinder S from the stationary cone 7, a pushing device 140 (FIG. 16D) is used to push the right end surface of the gravure cylinder S leftwards to separate from the stationary cone 7. At this time, since the arm units 51 and 52 are not moved, the gravure cylinder S held by the arm units 51 and 52 slides leftwards on the arm units 51 and 52.

Figure 17:
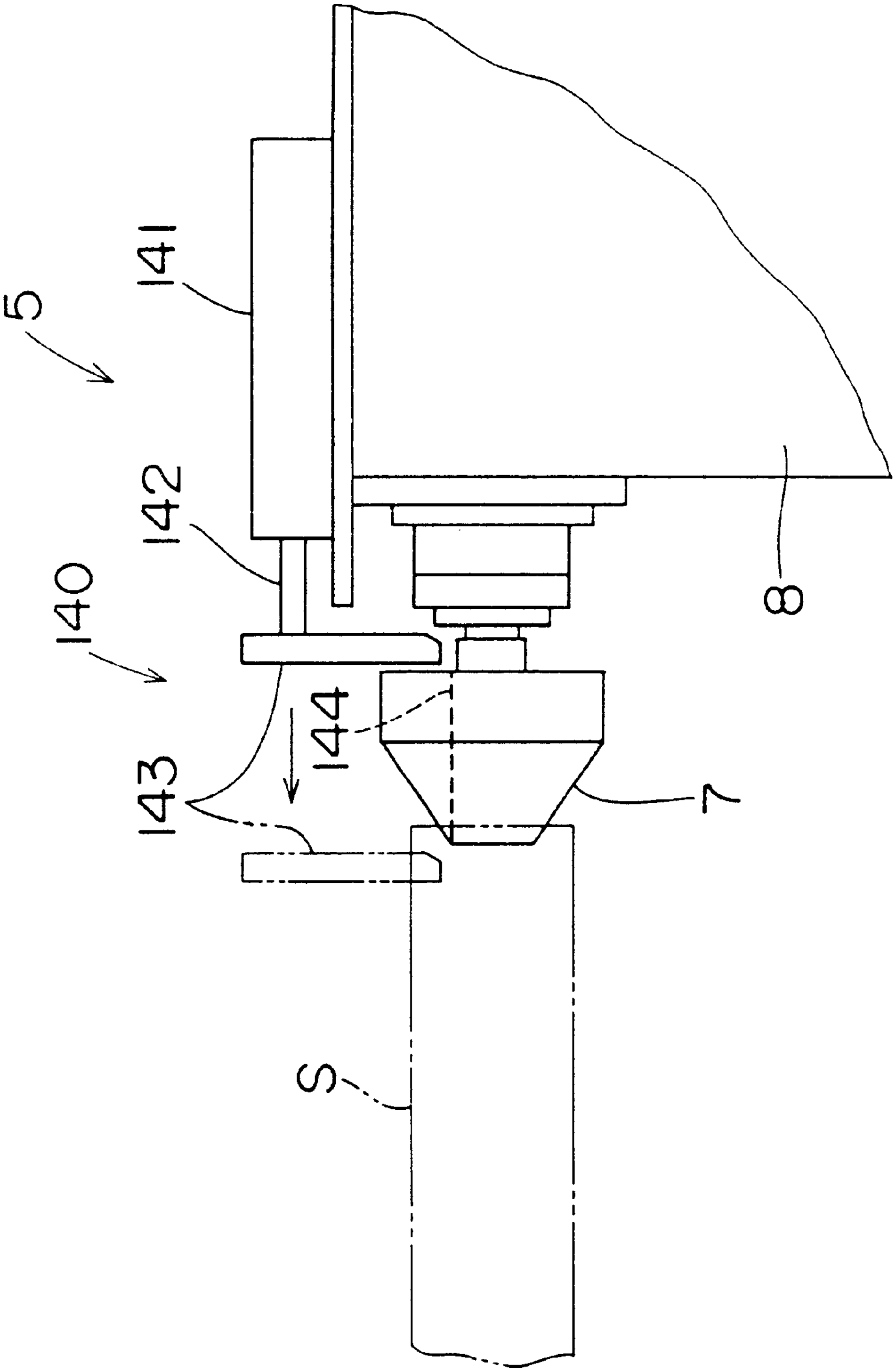
FIG. 17 is a front view of portions of the engraving machine, illustrating the arrangement of the first cone unit and its peripheries.
Figure 18:
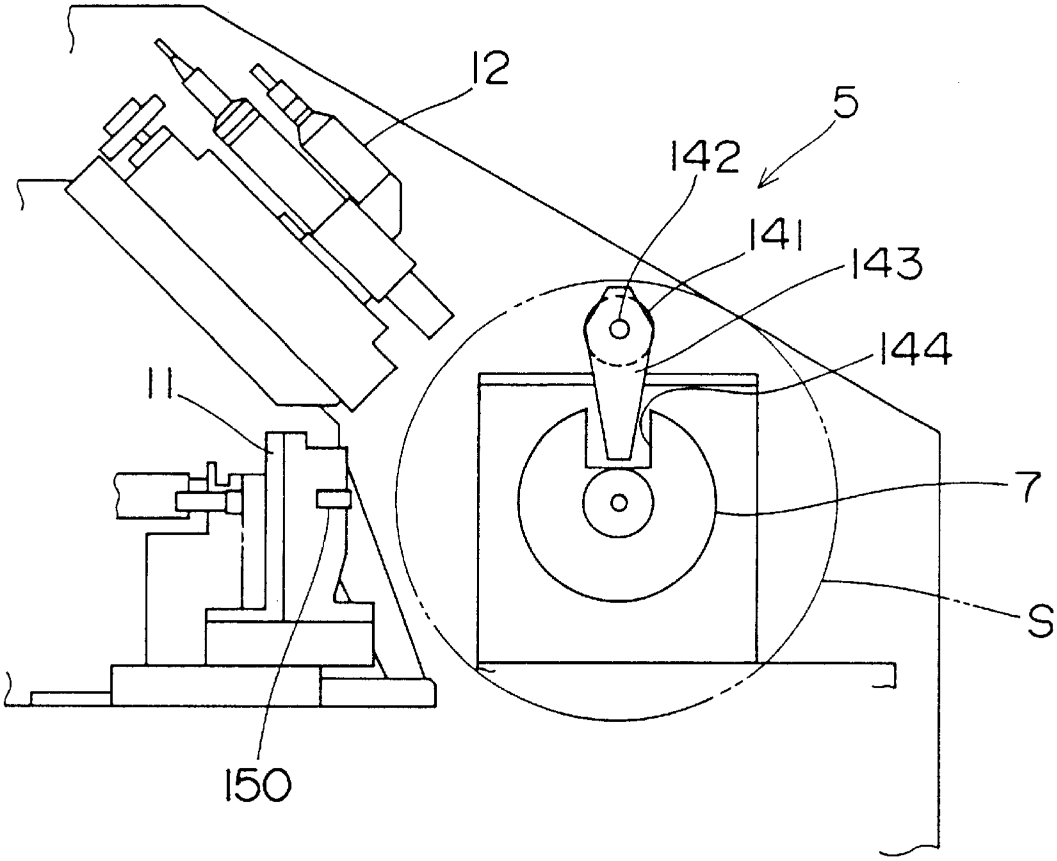
FIG. 18 is a vertical section of the engraving machine in left side elevation, chiefly illustrating the arrangement of the first cone unit.

The following description will discuss in detail the For details of pushing device 140 reference is made particularly to FIG. 17 which is a partial front view of the engraving machine 3, illustrating the first or stationary cone unit 5 and its peripheral structure. FIG. 18 is a longitudinal section view in left side elevation of the engraving machine 3, chiefly illustrating the structure in the vicinity of the first cone unit 5.

First cone unit 5 is constituted by the drive device 8 including a motor, a gear mechanism and the like, and the stationary cone 7 to be rotated by the drive device 8. The first cone unit 5 also has an air cylinder 141 secured to the drive device 8 or a frame relating thereto. The air cylinder 141 has a transversely slidable rod 142 to the left end of which a pushing piece 143 is fixed. Thus, the pushing device 140 is constituted by the air cylinder 141, the rod 142 and the pushing piece 143.

The stationary cone 7 is constituted by a truncated cone body formed by cutting the apex of a cone in a direction at a right angle to the axis thereof. The circumferential surface of the truncated cone body is arranged to be engaged with an end surface of the gravure cylinder S.

Gravure cylinders S, each of which is to be engaged with the stationary cone 7, may have a variety of diameters from a diameter greater than the largest diameter of the stationary cone 7 to a diameter smaller than the largest diameter thereof. In FIG. 17, a two-dot chain line shows a gravure cylinder S having the smallest diameter as engaged with the stationary cone 7.

The pushing piece 143 is disposed as downwardly extending from the rod 142 in a direction at a right angle thereto. With the slide movement of the rod 142, the pushing piece 143 is moved leftwards to push the right end surface of the gravure cylinder S, causing the same to be separated from the stationary cone 7. When the diameter of a gravure cylinder S is greater than the largest diameter of the stationary cone 7, the right end surface of the gravure cylinder S can be pushed by the pushing piece 143 when it slides to the left even when provision is made such that the lower end of the pushing piece 143 does not interfere with the stationary cone 7. However, when a gravure cylinder S of a diameter smaller than the largest diameter of the stationary cone 7 is used (as shown in FIG. 17), the pushing piece 143 would not interfere with the gravure cylinder S if the lower end of the pushing piece 143 did not interfere with the stationary cone 7. Thus, the pushing piece 143 could not push the right end surface of the gravure cylinder S. In this embodiment, the lower end of the pushing piece 143 extends down to a position where the same interferes with the stationary cone 7 as shown in FIG. 17. In such a case, however, when it is intended to move the pushing piece 143 leftwards for pushing the right end surface of the gravure cylinder S, the stationary cone 7 gets in the way to prevent the pushing piece 143 from being moved leftwards.

In this connection, as better shown in FIG. 18, the stationary cone 7 is provided in a part of its circumferential surface, with a notch 144 extending in the axial direction. When the stationary cone 7 is stopped such that the notch 144 is located just below pushing piece 143, the latter can be moved leftwards after passing through the notch 144 formed in the stationary cone 7. Thus, the pushing piece 143 can push the right end surface of a gravure cylinder S even though the same has the smallest diameter.

Shown in FIG. 18 are the engraving head 11 and a diamond bite 150 or stylus that is intermittently struck against the circumferential surface of the gravure cylinder S to form cells therein.

The inspection camera 12 is used for making sure of the state of the cells formed in the circumferential surface of the gravure cylinder S.

Description of the Sensors

The following description will discuss the sensors in the gravure engraving system according to the embodiment above-mentioned, particularly those for detecting data relating to the gravure cylinder S.

Referring to FIGS. 1 and 2, the stocker 1 has sensors for detecting whether or not a gravure cylinder S is being placed on a placing stand 17. For example, two sets of photosensors are provided. More specifically, there are disposed a sensor 100 for detecting the presence or absence of a gravure cylinder S on a placing stand 17*a* stopped at a position where the gravure cylinder S can be unloaded by the transport device 2, and a sensor 101 for detecting the presence or absence of a gravure cylinder S on a placing stand 17*b* stopped at a position that is more remote than sensor 100 from the transport device 2.

The sensor 100 is constituted by a light projecting element 102 and a light receiving element 103, and these elements 102 and 103 are fixed to the frame 16 of the stocker 1. Provision is made such that when the placing stand 17*a* is stopped at a predetermined position where the gravure cylinder S placed thereon can be unloaded by the arm units 51 and 52 of the transport device 2, the gravure cylinder S on the placing stand 17*a* is positioned to block the light that projects from the light projecting element 102 toward the light receiving element 103. This means that, when the light receiving element 103 receives light from the light projecting element 102, no gravure cylinder S is on the placing stand 17*a*, and that, when the light receiving element 103 does not receive such light, a gravure cylinder S is on the placing stand 17*a*.

The sensor 101 has an arrangement similar to that of sensor 100.

Also, the stocker 1 has a passage sensor 104 for detecting the diameter of a gravure cylinder S. That is, the passage sensor 104 is arranged to detect the diameter of a gravure cylinder S which is unloaded from the stocker 1 by the arm units 51 and 52 of the transport device 2 or which is returned back to the stocker 1 by the arm units 51 and 52.

For example, the passage sensor 104 is attached to the frame 16 of the stocker 1 at its side opposite to the transport device 2, and is constituted by a light emitting element 105 disposed at an upper portion of the frame 16 and a light receiving element 106 disposed at a lower portion of the frame 16. While a gravure cylinder S held by the arm units 51 and 52 is being moved between the stocker 1 and the transport device 2, the gravure cylinder S intercepts the light passage from the light emitting element 105 to the light receiving element 106. When the speed of movement of the gravure cylinder S by the arm units 51 and 52 in a back-and-forth direction (transverse direction in FIG. 1) is constant, the period of time during which the light passage from the light emitting element 105 to the light receiving element 106 is intercepted, is proportional to the diameter of the gravure cylinder S. Accordingly, by measuring the period of time between the time when the passage sensor 104 is first switched in output and the time that the passage sensor 104 is next switched in output, the diameter of the gravure cylinder S can be calculated.

The following description will discuss the sensors disposed in the arm units.

Referring to FIGS. 5, 6, and 8, two sensors are disposed in the support block 55S. One sensor is disposed for detecting whether or not a gravure cylinder S is being mounted on the support block 55S, and the other for detecting whether or not the left arm unit 52 has contacted with an end surface of the gravure cylinder S when the whole left arm unit 52 including the support block 55S has moved rightwards in FIG. 4.

As shown in FIGS. 6 and 8, the support block 55S is provided in the center of the mounting surface 91 with a recessed groove 92 extending in the back-and-forth direction. A light projecting sensor element 93 and a light receiving sensor element 94 are disposed in the recessed groove 92 such that these elements 93 and 94 do not protrude from the mounting surface 91.

While a gravure cylinder S is mounted on the support block 55S, light from the light projecting sensor element 93 to the light receiving sensor element 94 is intercepted by the gravure cylinder S as shown in FIG. 5. Accordingly, the presence or absence of gravure cylinder S can be detected by judging whether or not the light receiving sensor element 94 receives the light from the light projecting sensor element 93.

Referring to FIG. 6, an actuator 95 is disposed at the right end of the support block 55S in the left arm unit 52 and projects rightwards from the support block 55S. As shown in FIG. 8, the actuator 95 has a predetermined length in the back-and-forth direction (in the transverse direction in FIG. 8). The actuator 95 swings around a fulcrum 96 when an article comes in contact with the lower end of the actuator 95. By this swing, a light shade plate 97 integrated with the actuator 95 intercepts light which passes through a sensor 98.

In the foregoing, the description has been made of the gravure cylinder detecting sensors. In addition, there are disposed, as necessary, microsensors or the like for detecting, for example, whether or not the arm units 51 and 52 properly operate. However, since these sensors do not particularly take part in the features of the present invention, the description thereof is here omitted.

Arrangement of the Whole System

Figure 19:
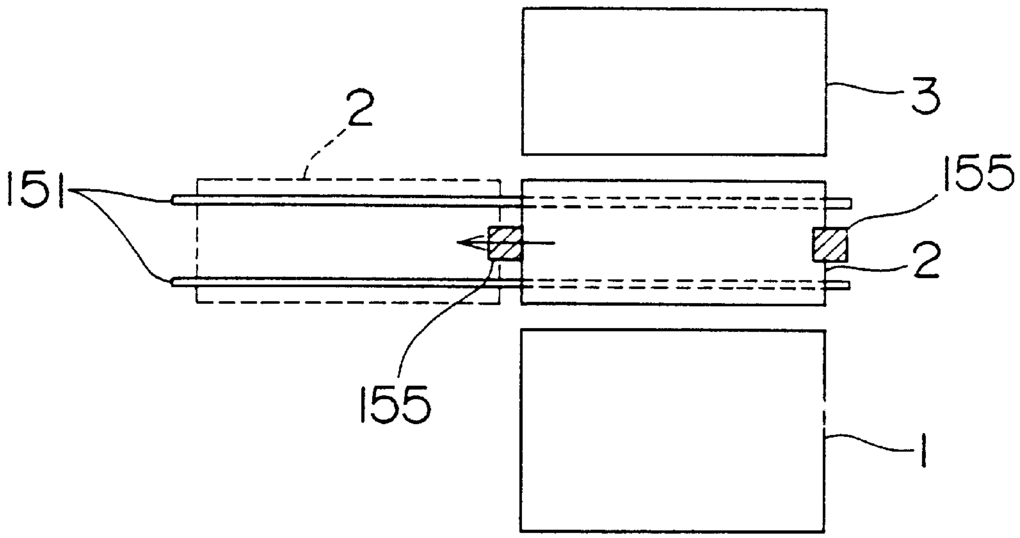
FIG. 19 is a schematic plan view of the gravure engraving system according to the embodiment of the present invention, illustrating the positional relationship among the stocker, the transport device and the engraving machine, and the arrangement where the transport device is movable.

FIG. 19 is a schematic plan view of the system, illustrating the positional relationship between stocker 1, the transport device 2 and the engraving machine 3 in an arrangement where the transport device 2 is movable. As shown in FIG. 19 and FIG. 2 that has been described earlier herein, the stocker 1, the transport device 2 and the engraving machine 3 are disposed in this order from the front side to the rear side. Accordingly, in such an arrangement, the transport device 2 and the engraving machine 3 are to be maintained with difficulty and a gravure cylinder cannot manually be set on the engraving machine 3.

In this connection, the embodiment in FIG. 19 is arranged such that the whole transport device 2 can be slid leftwards. That is, two rails 151 are disposed under the transport device 2 such that the same is transversely movable thereon.

Figure 20:
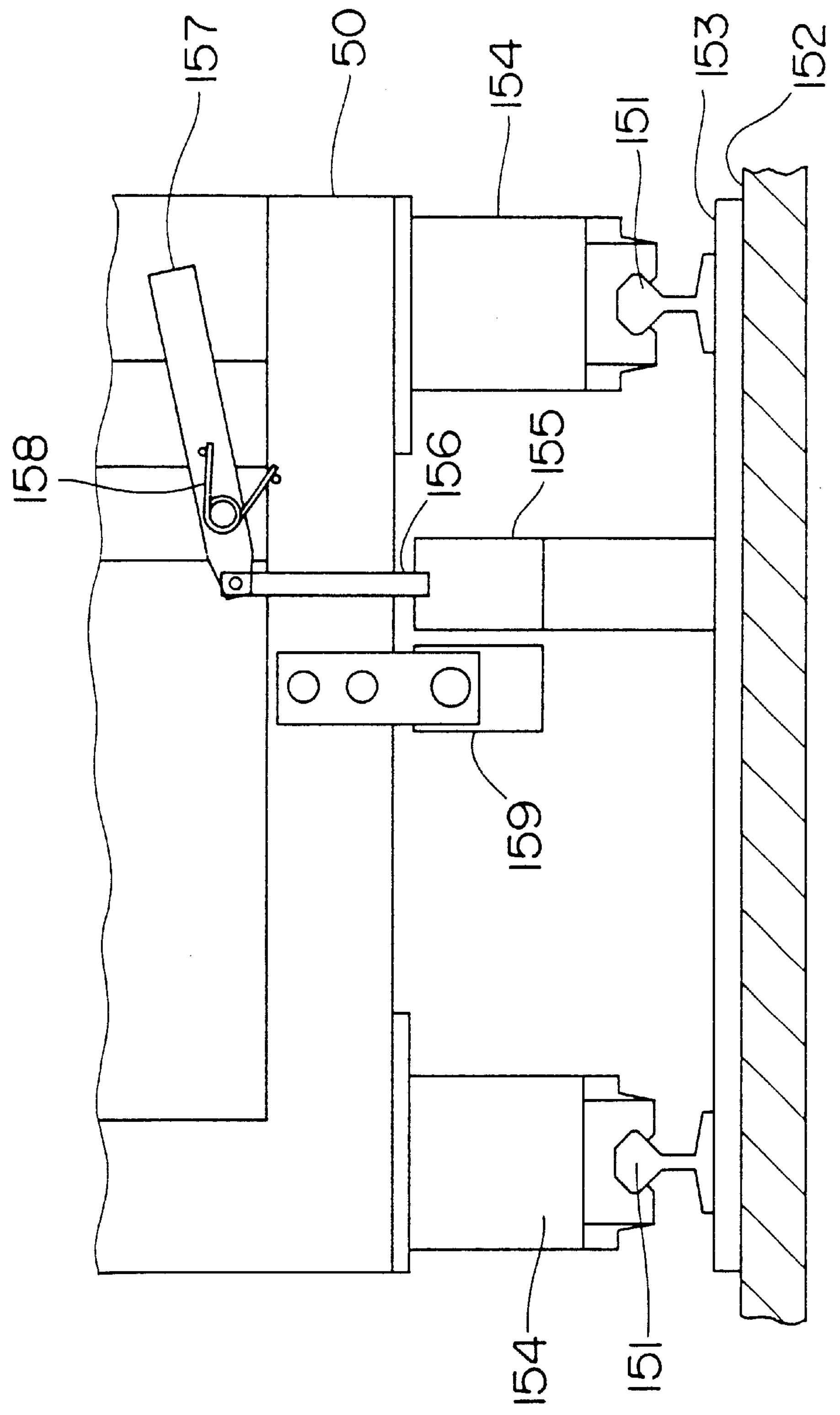
FIG. 20 is a section through portions of the right side of the transport device, illustrating the rails and their relevant portions.

FIG. 20 is a section view of portions of the right side of the transport device 2, illustrating the structure relating to the rails 151. As shown in FIG. 20, the two rails 151 are installed on a stand plate 153 on a floor surface 152. Legs 154 project downwardly from the frame 50 of the transport device 2, and the lower ends of the legs 154 are slidably engaged with the rails 151.

Engagement pieces 155 are fixed to the stand plate 153 at respective positions corresponding to the transport and retreat positions of the transport device 2. That is, the engagement pieces 155 are arranged to fix (hold) the transport device 2 at the transport position shown by solid lines in FIG. 19 when the same has been moved thereto, and at the retreat position shown by broken lines in FIG. 19 when the same has been moved thereto. Meanwhile, the frame 50 of the transport device 2 has a pin 156 downwardly projecting from the frame 50, and a pedal 157 coupled with the pin 156 for vertically moving the same. The pedal 157 is biased by a spring 158 such that the operating portion thereof is normally turned up. As a result, the pin 156 coupled with the pedal 157 normally projects under the frame 50.

When the transport device 2 is moved along the rails 151 to the predetermined transport or retreat position, the pin 156 is engaged with one of the engagement pieces 155, causing the transport device 2 to be fixed at the transport or retreat position such that the same cannot be moved. For moving the transport device 2, the pedal 157 may be pushed down to disengage the pin 156 from the engagement piece 155 and the transport device 2 may be pushed transversely.

Preferably, the transport device 2 transversely movable along the rails 151 is provided at both moving ends thereof with shock absorbers 159 each formed by a rubber pad or the like. The shock absorbers 159 are arranged to absorb a shock exerted on the transport device 2 when the transverse terminal ends thereof come into collision with stop pieces, walls or the like in the transverse movement of the transport device 2.

General Arrangement of Systems of Other Embodiments

Figure 21B:
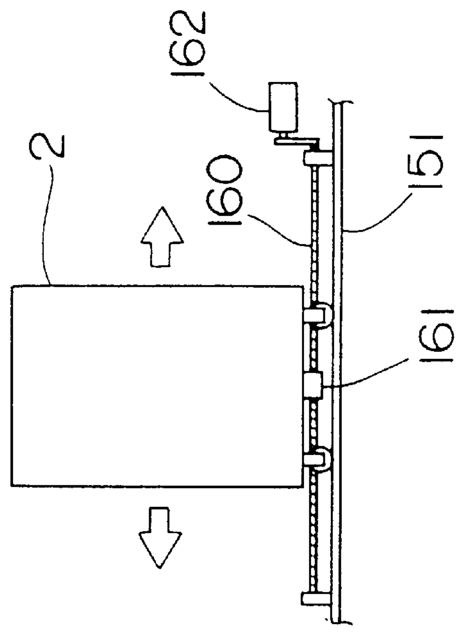
FIG. 21A and FIG. 21B are plan and side views respectively illustrating a system according to another embodiment of the present invention.
Figure 21A:
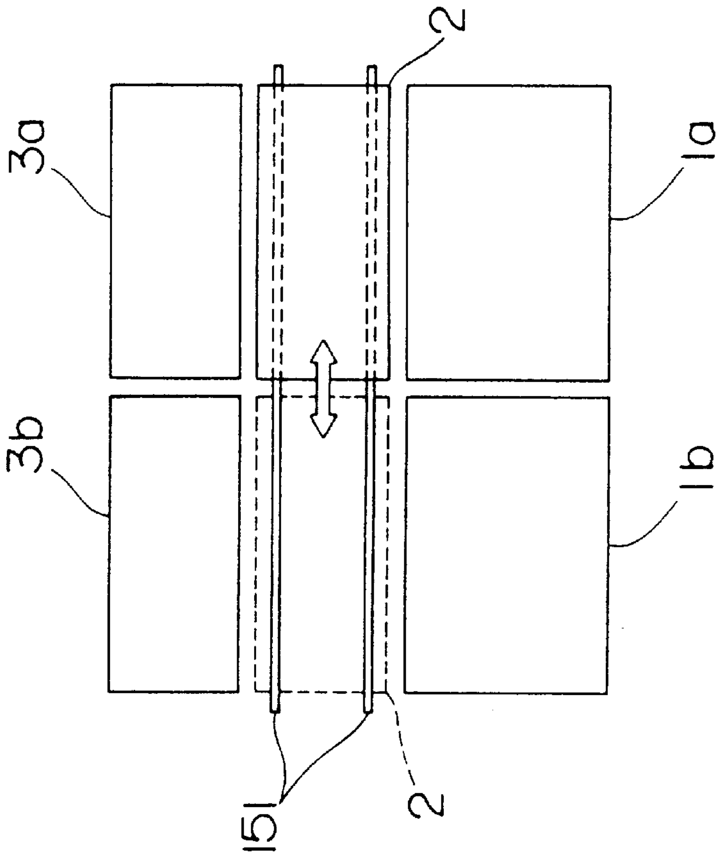

FIG. 21 shows the arrangement of a system according to another embodiment of the present invention. FIG. 21A is a plan view of a gravure engraving system where a plurality of stockers 1*a* and 1*b*, a single transport device 2, and a plurality of engraving machines 3*a* and 3*b* are disposed.

The transport device 2 is transversely movable on rails 151 installed thereunder. While the transport device 2 is stopped for example between the stocker 1*a* and the engraving machine 3*a*, a gravure cylinder can be transported between the stocker 1*a* and the transport device 2 and between the engraving machine 3*a* and the transport device 2. Likewise, while the transport device 2 is stopped between the stocker 1*b* and the engraving machine 3*b*, a gravure cylinder can be transported between the stocker 1*b* and the transport device 2 and between the engraving machine 3*b* and the transport device 2. Accordingly, it is possible for example that the transport device 2 is stopped at a position opposite to the stocker 1*a*, a gravure cylinder stored in the stocker 1*a* is unloaded, and the gravure cylinder thus unloaded is then set to the engraving machine 3*a*. Or, it is also possible that the transport device 2 which is holding a gravure cylinder unloaded from the stocker 1*a*, is moved along the rails 151 and then stopped at a position opposite to the engraving machine 3*b*, and the gravure cylinder held by the transport device 2 is set to the engraving machine 3*b*.

Thus, in the embodiment shown in FIG. 21, a gravure cylinder can be transported by the single transport device 2 between any of a plurality of stockers and any of a plurality of engraving machines.

FIG. 21B shows an example of a moving mechanism for moving the transport device 2 along the rails 151. As shown in FIG. 21B, a screw shaft 160 is disposed in parallel with the rails 151. An internally threaded member 161 with balls is fitted to the screw shaft 160 and the outer casing of member 161 is fixed to the transport device 2. The screw shaft 160 is rotated by a drive device such as a motor 162 or the like. Thus, the transport device 2 can be transversely smoothly moved and the moving amount thereof can be controlled by the rotation of the motor 162.

In the embodiment above-mentioned, a plurality of stockers 1 and a plurality of engraving machines 3 are disposed. However, provision may be made such that a single stocker 1 is disposed and a gravure cylinder is transported from the single stocker 1 to any of a plurality of engraving machines 3 by a common transport device 2.

The number of each of stockers 1 and engraving machines 3 to be disposed may suitably be changed according to requirements of the user factory or the like that employs the gravure engraving system of the present invention.

Operation of the System

The following description will discuss in detail the job operation and control operation of the gravure engraving system according to the embodiment of the present invention.

Figure 22:
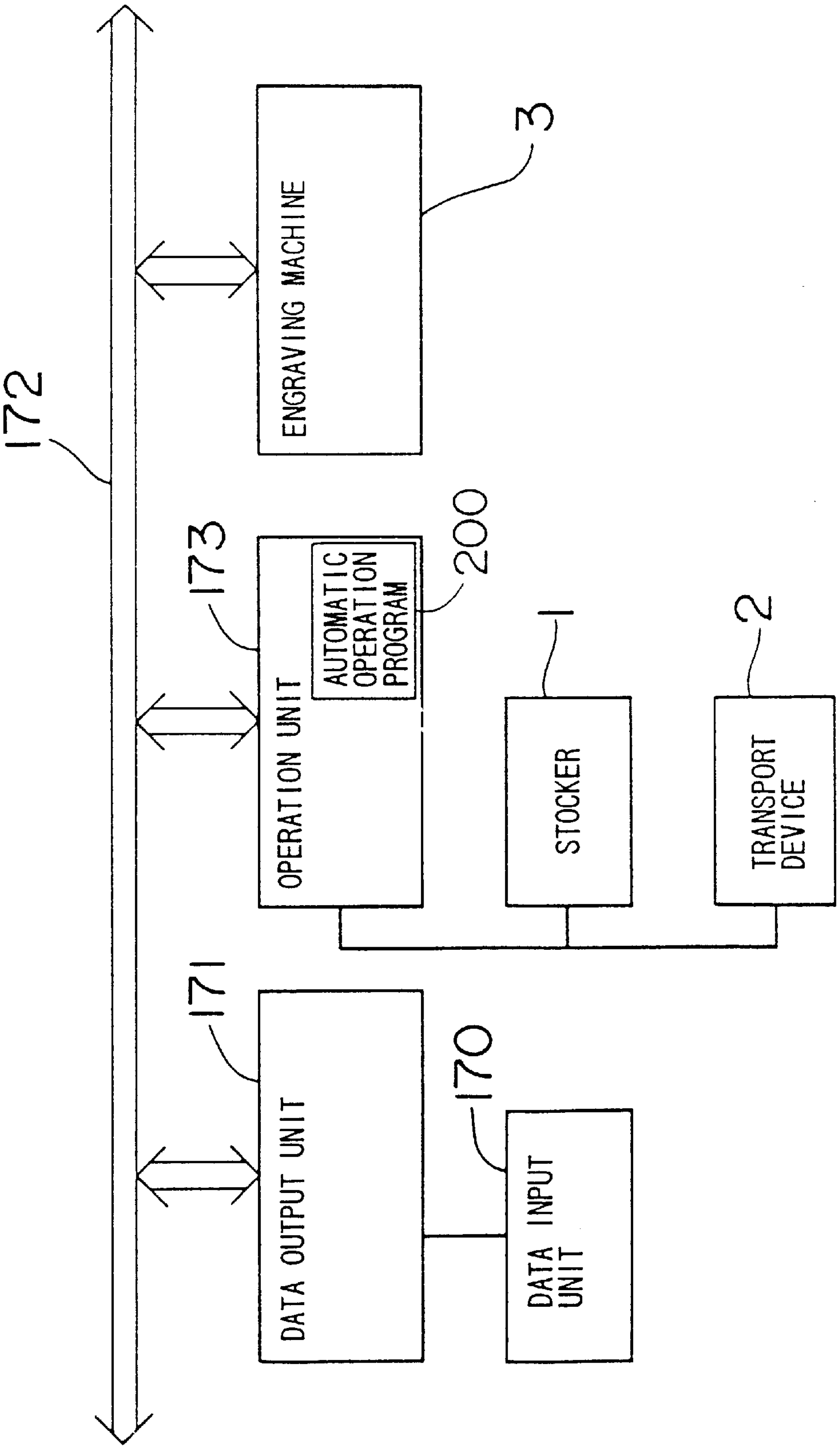
FIG. 22 is a block diagram of the control circuitry in the system instructed according to the present invention.

FIG. 22 is a block diagram of a control circuitry in the gravure engraving system in FIGS. 1 and 2. The control circuitry is constituted by a data input unit 170 and a data output unit 171. The data input unit 170 is a device for entering image data, character data and the like and is constituted by a keyboard, a display, a scanner, a mouse and the like. The data output unit 171 is a device for forming gravure engraving data by editing and arranging data entered from the data input unit 170. The data output unit 171 is connected, through a bus 172, to an operation unit 173 of the stocker 1 and the transport device 2. The operation unit 173 is provided with a processing device including microcomputer. The processing device contains an automatic operation program 200 in a suitable storage medium. The automatic operation program 200 is arranged to be invoked according to data supplied from the data output unit 171. According to this program 200, the stocker 1 and the transport device 2 are driven. Further, the data output unit 171 is connected to the engraving machine 3 through the bus 172. The engraving machine 3 is arranged to execute a predetermined engraving processing according to engraving data supplied from the data output unit 171.

Figure 23:
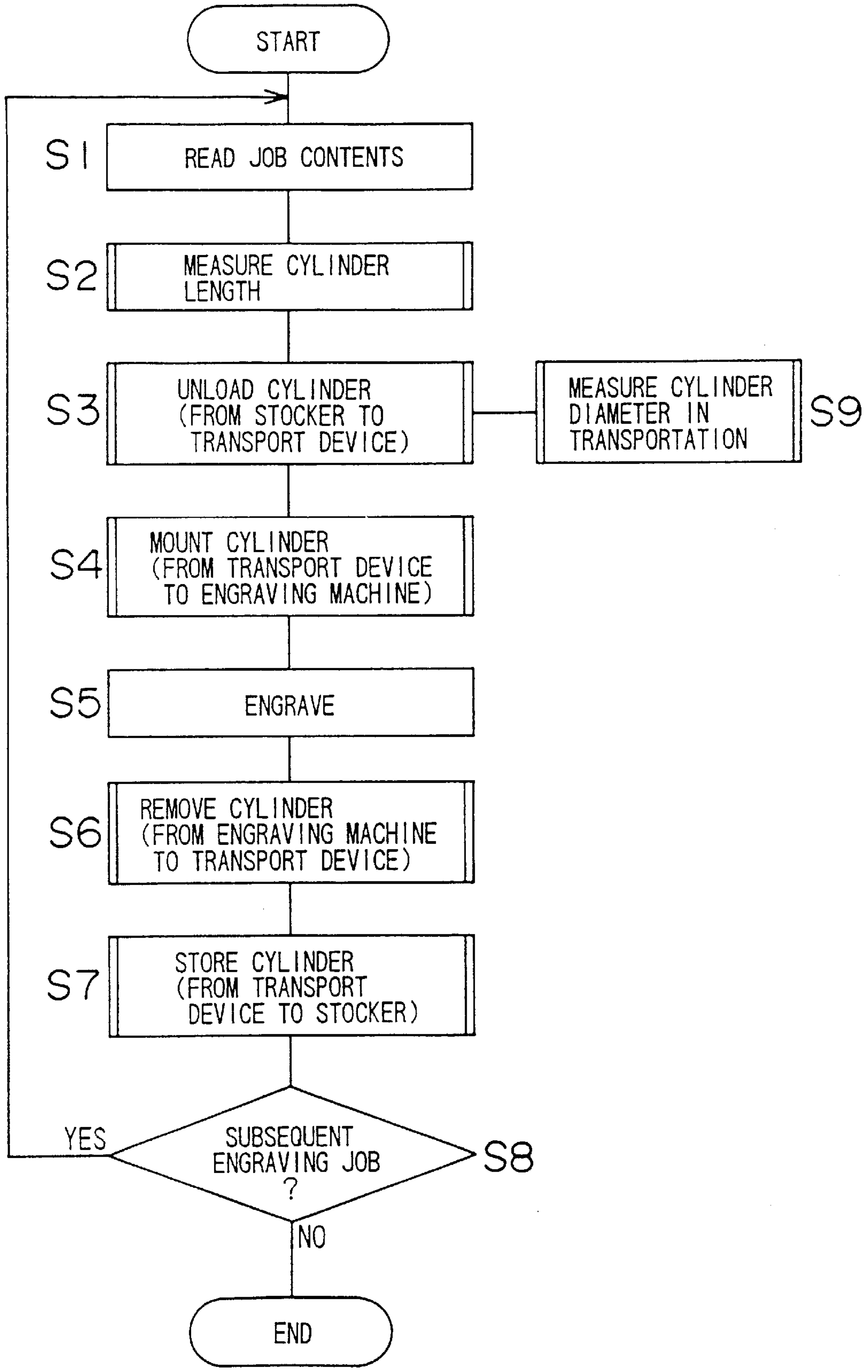
FIG. 23 is a flow chart illustrating the outline of the job processing of the system constructed according to the embodiment.

FIG. 23 is a flow chart illustrating the job processing of the gravure engraving system according to this embodiment. It is noted that data required for the job are previously entered from the data input unit 170 and edited and arranged by the data output unit 171. When the job starts, job contents are read by the operation unit 173 through the bus 172 (Step S1). In reading the job contents, one of a plurality of job contents previously designated is read out. The job contents include a variety of engraving conditions such as the number of the placing stand 17 on which a gravure cylinder to be used is being placed (See FIG. 1), the file name of data to be used for engraving, the number of lines to be engraved, cell shape (elongate, compressed, etc.) and the like.

Upon completion of reading the job contents, the length of the gravure cylinder to be used is measured (Step S2). This measurement processing is conducted by moving the left arm unit 52 (See FIG. 4) but its detail will be discussed later.

Then, the gravure cylinder is unloaded (Step S3). That is, the gravure cylinder is delivered from the stocker 1 to the transport device 2, and then transported. In the course of such delivery, the diameter of the gravure cylinder is measured as mentioned earlier (Step S9).

Then, the gravure cylinder is supplied from the transport device 2 to the engraving machine 3 and attached to a predetermined portion thereof (Step S4).

Then, predetermined engraving is applied onto the circumferential surface of the gravure cylinder by the engraving machine 3 (Step S5).

The gravure cylinder is removed from the engraving machine 3 and transported by the transport device 2 (Step S6). The engraved gravure cylinder is transported from the transport device 2 to a vacant placing stand 17 of the stocker 1 (Step S7).

At the operation unit 173, it is judged whether or not there is an engraving job to be subsequently executed (Step S8). In the affirmative, the operations from Step S1 are repeated. In the negative, the job processing is then finished.

Figure 24:
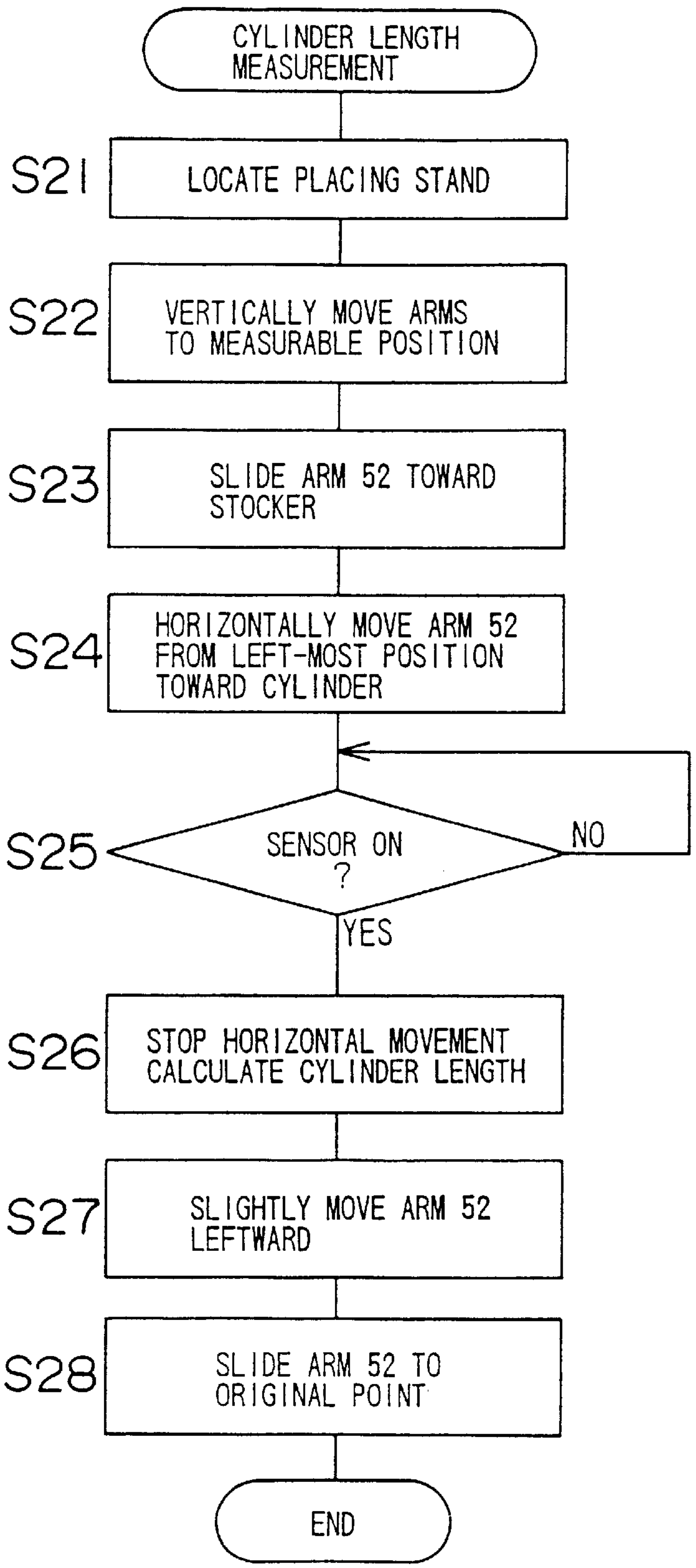
FIG. 24 is a flow chart illustrating in detail the gravure cylinder length measuring processing shown in FIG. 23.

FIG. 24 is a flow chart illustrating in detail the processing of measuring the length of a gravure cylinder, which is executed at the step S2 in FIG. 23.

First, the positions of the placing stands 17 in the stocker 1 are determined (Step S21). More specifically, as shown in FIG. 1, the placing stand 17*a* on which the gravure cylinder S intended to be used is being placed, is located in a predetermined unloading position (shown by A in FIG. 1).

Then, the arm units 51 and 52 are vertically moved and stopped at a measurable position (Step S22). The measurable position in the vertical direction refers to a position having a height such that the actuator 95 of the left arm unit 52 shown in FIG. 6 can come in contact with the end surface of the gravure cylinder S on the placing stand 17*a* in FIG. 1. The gravure cylinder S on the placing stand 17*a* is different in diameter dependent on the type. Accordingly, based on the position of the positioned placing stand 17*a*, the heightwise measurement position is determined such that the actuator 95 can come in contact with the end surface of the gravure cylinder S even though the diameter thereof is small.

At this time, the arm units are located in the original point in both the transverse direction and the back-and-forth direction. The original point refers to the position where the arm units are not being slid in the back-and-forth direction and are located in the state shown in FIG. 10A, and where the left arm unit 52 is located in the leftmost position, the second reference position, as shown in FIG. 4.

As shown in FIG. 4 for example, the left arm unit 52 is then slid (forwardly) toward the stocker 1 (Step S23). As mentioned earlier, each of the right arm unit 51 and the left arm unit 52 has a motor for horizontally moving the same. Accordingly, the right arm unit 51 and the left arm unit 52 can be operated individually in a slide movement in the horizontal back-and-forth direction. At the step S23, only the left arm unit 52 is horizontally slid toward the stocker 1. As a result, the left arm unit 52 is brought to the state shown in FIG. 1D. Setting is previously made such that, at this state, the center of the support block 55S is opposite to the center of the left end surface of the gravure cylinder S placed on the placing stand 17*a* of the stocker 1 in FIG. 1

Then, the left arm unit 52 is horizontally moved rightwards as shown in FIG. 14 (Step S24). When the left arm unit 52 is continuously moved rightwards in FIG. 14, the actuator 95 of the left arm unit 52 (See FIG. 6) is then displaced as coming in contact with the left end surface of the gravure cylinder S placed on the placing stand 17*a* (See FIG. 1). Then, the sensor 98 in FIG. 8 is turned on (Step S25) to top the horizontal rightward movement of the left arm unit 52 and measure the length of the gravure cylinder S (Step S26). To this end, the automatic operation program 200 in the operation unit 173 recognizes, as the first reference position, the position where the right end surface is regulated by the regulating plate 38. The automatic operation program 200 has previously set the above-mentioned second reference position, and controls the motor 126 so that the initial position of the left arm unit 52 is the second reference position.

The length of a gravure cylinder S can be obtained in the following manner. In FIG. 4 for example, the left arm unit 52 starts moving rightwards from the leftmost position, the second reference position, and stops when the left arm unit 52 comes in contact with the left end surface of the gravure cylinder. The amount of movement of the left arm unit 52 can be obtained, for example, by counting the number of pulses given to the motor 126 (See FIG. 12) for moving the left arm unit 52. As shown in FIG. 3, each gravure cylinder S is placed in the stocker 1 such that the right end surface of the gravure cylinder S comes in contact with the regulating plate 38. In other words, each gravure cylinder S is disposed such that the right end thereof is located along the predetermined first reference position. Accordingly, the length of the gravure cylinder S can be calculated by subtracting, from the distance between the predetermined first reference position and the second reference position, the distance by which the left arm unit 52 has moved.

Then, the left arm unit 52 is moved slightly leftwards such that the actuator 95 (See FIG. 6) does not come in contact with the left end surface of the gravure cylinder (Step S27).

Then, the left arm unit 52 is slid in the back-and-forth direction with the transverse position maintained as it is, such that the slide arm member 54 is returned to the original point in the back-and-forth direction (See FIG. 10A) (Step S28).

In the embodiment above-mentioned, the second reference position is defined as the position where the left arm unit 52 is located in the leftmost position. However, the second reference position may be a position separated, from the first reference position, by a predetermined distance toward the other end of the gravure cylinder. Further, the sensor 98 disposed at the left arm unit 52 has the mechanically operated actuator 95 (See FIG. 6). Instead of the mechanical type, the sensor 98 may be of the optical type having for example a light projecting element and a light receiving element and arranged such that light from the light projecting element is reflected from the circumferential surface of the gravure cylinder and received by the light receiving element. When such an optical sensor is used, the other end surface of the gravure cylinder can be detected even though the left arm unit 52 does not come in contact with the end surface of the gravure cylinder. Further, when such an optical sensor is used, the second reference position can be set at a predetermined position separated, from the first reference position, by a distance shorter than the length of the gravure cylinder. That is, since the sensor actuator is not required to come in contact with the gravure cylinder, an end surface of the gravure cylinder can be detected without the gravure cylinder and the left arm unit 52 physically interfering with each other.

Figure 25:
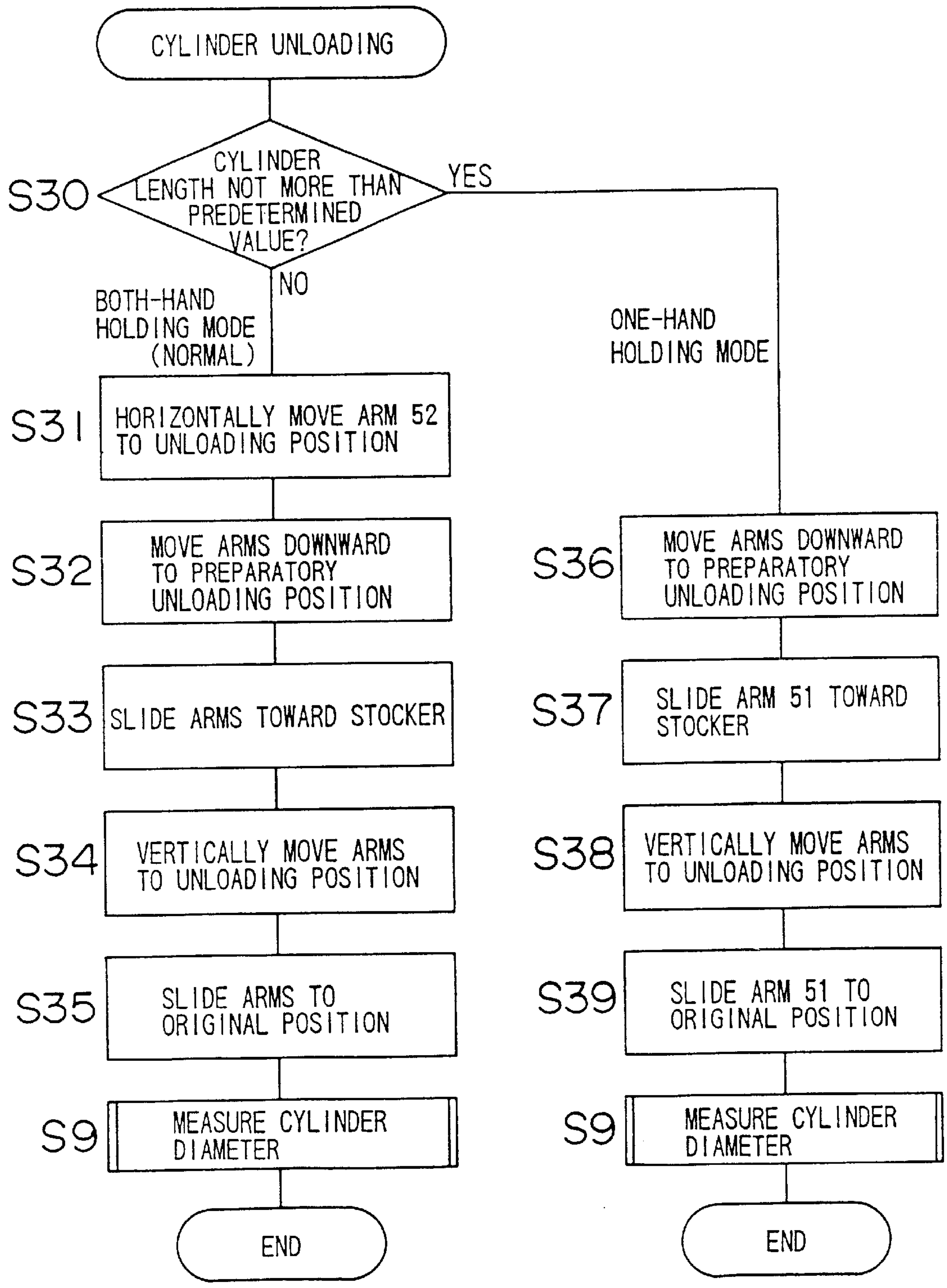
FIG. 25 is a flow chart illustrating in detail the gravure cylinder unloading processing shown in FIG. 23.

FIG. 25 is a flow chart illustrating in detail the gravure cylinder unloading processing at step S3 in FIG. 23.

In the gravure cylinder unloading processing, it is first judged whether or not the length of the gravure cylinder measured at the step S2 in FIG. 23 is equal to or less than a predetermined value (Step S30). As mentioned earlier, such a judgment is required to determine whether the gravure cylinder is to be held by two arm units, i.e., both the right arm unit 51 and the left arm unit 52 (referred to as "both-hand holding" hereinafter), or only by the right arm unit 51 (referred to as "one-hand holding" hereinafter).

When the gravure cylinder length is greater than the predetermined value, the gravure cylinder is transported in a so-called both-hand holding mode using the two arm units 51 and 52 (Step S31 to S35).

Here, the left arm unit 52 is first moved by a predetermined amount rightwards in FIG. 2 for example. When the measurement of the gravure cylinder length is finished, the left arm unit 52 is located in a position slightly leftwards with respect to the left end surface of the gravure cylinder when transversely viewed from the front side. Accordingly, the left arm unit 52 is moved rightwards to a position where the left arm unit 52 can hold the gravure cylinder. The amount of movement is adjusted based on the calculated gravure cylinder length.

Then, the arm units 51 and 52 are downwardly moved by a predetermined amount. As discussed with reference to FIGS. 12 and 13, such downward movements are synchronously conducted at the same time. The arm units 51 and 52 are stopped at preparatory unloading positions opposite to the space 46 of the placing stand 17 on which the gravure cylinder to be unloaded is being placed (See FIG. 3).

Then, the arm units 51 and 52 are horizontally forwardly slid toward the stocker 1 (Step S33). Therefore, the support blocks 55L and 55S (See FIG. 4) of the arm units 51 and 52 are entered into the space 46 (See FIG. 3) and located under the gravure cylinder S to be unloaded.

Then, the arm units 51 and 52 are moved upward, causing the support blocks 55L and 55S to support the gravure cylinder S (Step S34). This unloading position is slightly above the position where the gravure cylinder S is held by the stationary holding portion 33 and the movable holding portion 34 in FIG. 3.

Then, the arm units 51 and 52 are rearwardly slid under the velocity control thereof and returned to the original point (Step S35).

When returned to the original point at the step S35, the gravure cylinder S is measured in diameter (Step S9). How to measure the diameter will be discussed later.

On the other hand, when the gravure cylinder length is not greater than the predetermined value, a so-called one-hand holding mode is carried out. The operations in this mode is the same as the operations in the both-hand holding mode above-mentioned except that the left arm unit 52 is not moved in the back-and-forth direction and in the transverse direction. As mentioned earlier, the vertical movements of the arm units 51 and 52 are cooperatively conducted by the single motor 121 (See FIG. 12). Accordingly, even in the one-hand holding mode, the left arm unit 52 is vertically moved.

In the one-hand holding mode, an operation corresponding to the step S31 is omitted, and there are executed operations at steps S36, S37, S38, and S39 respectively corresponding to the steps S32, S33, S34, and S35. Thereafter, the gravure cylinder is measured in diameter likewise in the both-hand holding mode (Step S9).

Figure 26:
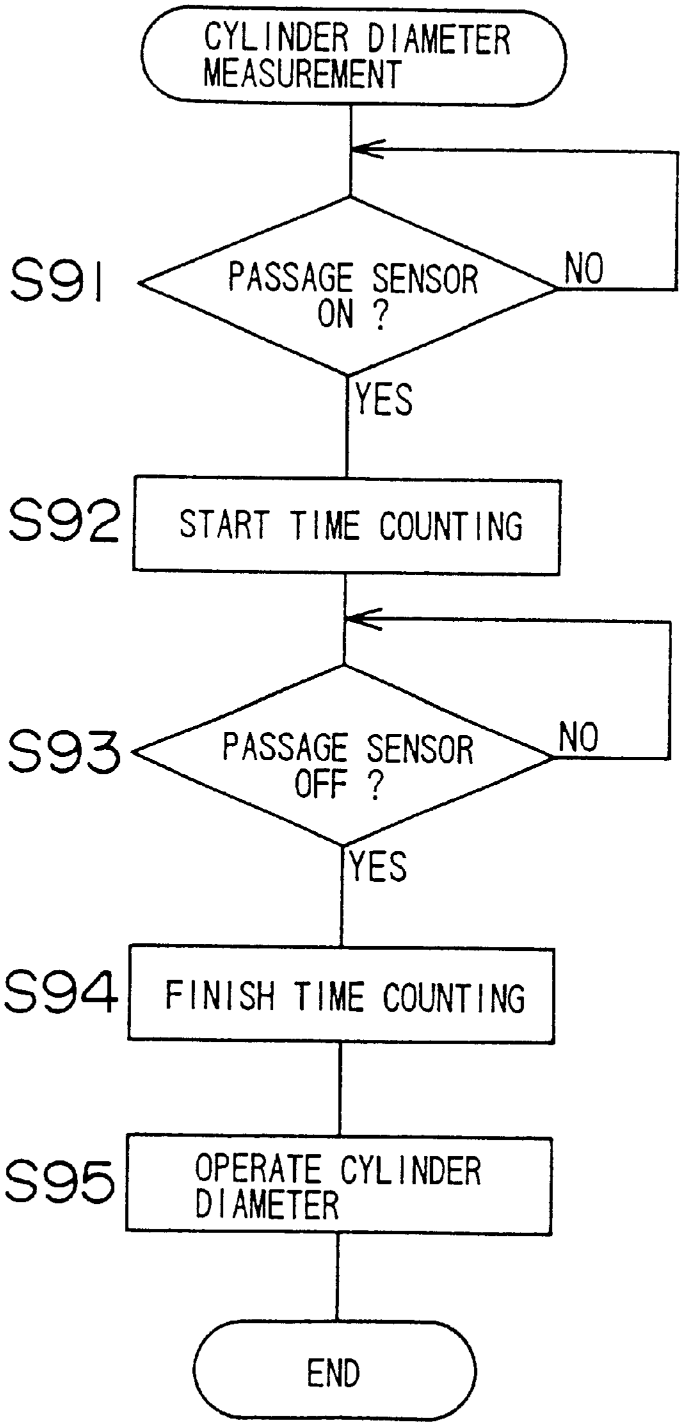
FIG. 26 is a flow chart illustrating in detail the gravure cylinder diameter measuring processing shown in FIG. 23.

FIG. 26 is a flow chart of the gravure cylinder diameter measurement processing at the step S9 in FIGS. 23 and 25.

As discussed with reference to FIGS. 1 and 2, the diameter of a gravure cylinder is measured using the passage sensor 104. First, it is judged whether or not the passage sensor 104 (See FIG. 1) is turned on (Step S91). As shown in FIG. 1, there is formed, in the passage sensor 104, a light passage (detection line) from the light emitting element 105 to the light receiving element 106. When this light passage is blocked, the passage sensor 104 is turned on. As shown in FIG. 2, the movements of the arm units 51 and 52 in the back-and-forth direction do not intercept the light passage. However, when a gravure cylinder is being placed on the arm units 51 and 52, the movement of the placed gravure cylinder in the back-and-forth direction intercepts the light passage of the passage sensor 104.

When it is judged that the passage sensor 104 is being turned on (YES at Step S91), time counting starts (Step S92). Thereafter, when the gravure cylinder is moved such that the light passage of the passage sensor 104 is cleared, and it is judged that the passage sensor 104 is being turned off (YES at Step S93), time counting is finished (Step S94).

Based on the time thus counted, the diameter of the gravure cylinder is operated (Step S95). The operation can be conducted for example by multiplying the counting time by the back-and-forth transport speed.

Figure 27:
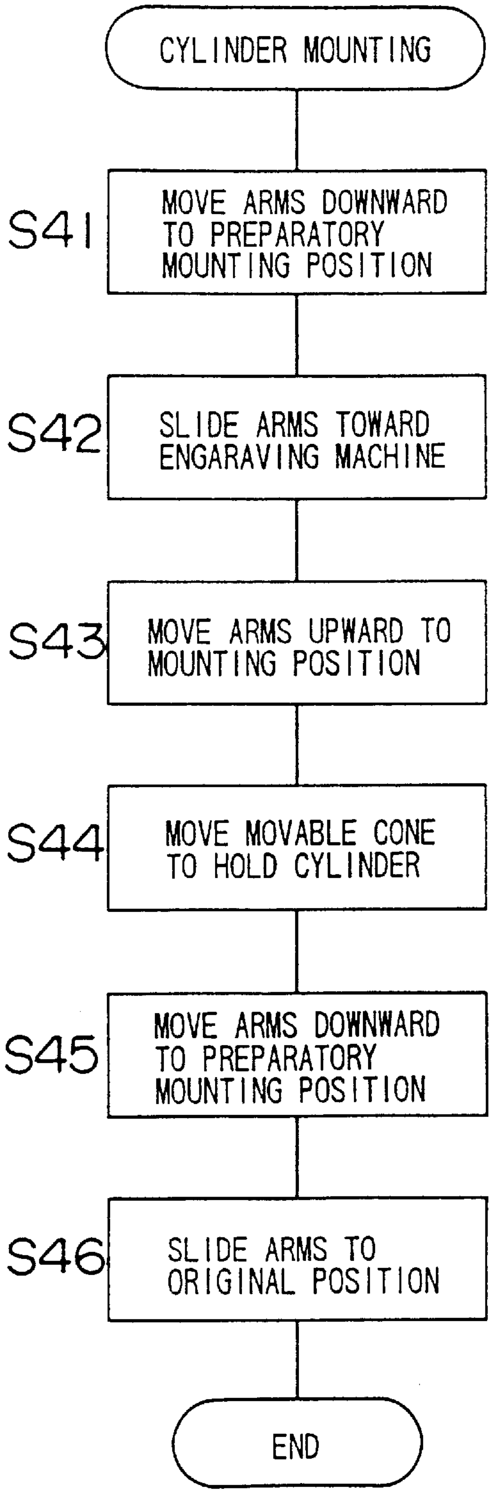
FIG. 27 is a flow chart illustrating in detail the gravure cylinder mounting processing shown in FIG. 23.

FIG. 27 is a flow chart of the cylinder mounting processing for setting a gravure cylinder to the engraving machine 3, shown at the step S4 in FIG. 23.

In the cylinder mounting processing, the arm units 51 and 52 are normally downwardly moved to a preparatory mounting position (Step S41). The preparatory mounting position is not the position, as shown in FIG. 16A, where the axis of the gravure cylinder S held by the arm units 51 and 52 is identical in height with the axes of the cones 7 and 9, but refers to a position where the axis of the gravure cylinder S is located in a position lower than the axes of the cones 7 and 9. After the arm units 51 and 52 are lowered to the preparatory mounting position, the arm units 51 and 52 are rearwardly slid to the engraving machine position shown in FIG. 10D (Step S42). In the one-hand holding mode, only the right arm unit 51 is driven.

Then, the arm units 51 and 52 are upwardly moved, according to the diameter of the gravure cylinder held thereby, to the mounting position where the axis of the held gravure cylinder S is identical in height with the axes of the cones 7 and 9 as shown in FIG. 16A (Step S43).

Then, the movable cone 9 is moved rightwards as shown in FIG. 16A, and then the gravure cylinder S is held at both its ends by and between the stationary cone 7 and the movable cone 9 (Step S44).

Then, the arm units 51 and 52 are moved down to the preparatory mounting position (Step S45), then horizontally slidably moved and returned to the original point (Step S46).

In the cylinder mounting processing, the preparatory mounting position discussed in connection with the steps S41 and S45 is set for the following reasons.

Firstly, by setting such a preparatory mounting position, it is the single passage that a gravure cylinder passes through when it is transported between the transport device 2 and the engraving machine 3. This presents structural advantages such as a reduction in the number of transport detection sensors or the like.

Secondly, when removing a gravure cylinder from the engraving machine 3, if the gravure cylinder as caught by a cone is moved in the unloading direction (horizontal forward direction), this may be dangerous. That is, there is a possibility of the relatively heavy gravure cylinder falling down. Accordingly, from a safety viewpoint it is preferable to have the gravure cylinder lowered before removal. Thus, the preparatory mounting position is provided. Whether or not the gravure cylinder to be removed is being caught by a cone, when such an arrangement is adopted, the preparatory mounting position may be omitted.

Figure 28:
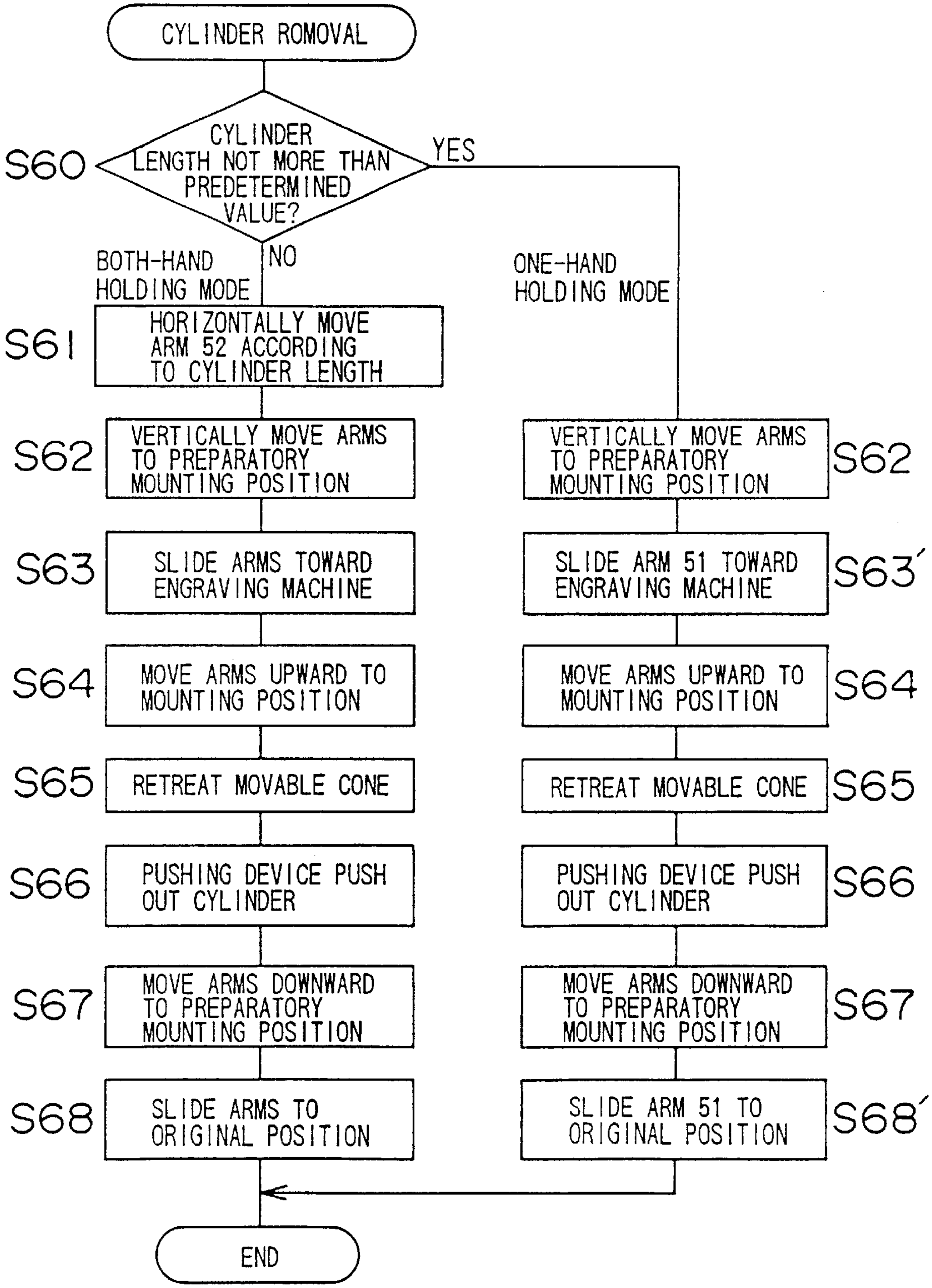
FIG. 28 is a flow chart illustrating in detail the gravure cylinder removal processing shown in FIG. 23.

FIG. 28 is a flow chart of the gravure cylinder removal processing at the step S6 in FIG. 23. In this processing too, operations to be executed vary with the gravure cylinder length measured at the step S2 in FIG. 23. More specifically, there is executed a both-hand holding processing, using the arm units 51 and 52, when the gravure cylinder length is greater than a predetermined value, and there is executed a one-hand holding processing, using only the arm unit 51, when the gravure cylinder length is not greater than the predetermined value.

More specifically, it is judged whether or not the length of a gravure cylinder to be removed is equal to or less than a predetermined value (Step S60). When the length is greater than the predetermined value, the left arm unit 52 is moved in the transverse direction (in FIG. 16C for example) according to the length of the gravure cylinder (Step S61). Then, the arm units 51 and 52 are vertically moved to the preparatory mounting position (Step S62).

Thereafter, the arm units 51 and 52 are horizontally rearwardly slidably moved to the engraving machine position after which Step S63 arm units 51 and 52 are moved upwardly, according to the diameter of the gravure cylinder, to the mounting position where the gravure cylinder S can be held (Step S64).

Figure 16D:
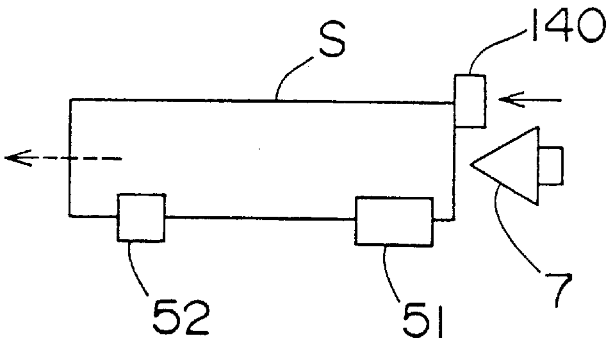

Then, the movable cone 9 is retracted leftwards as shown in FIG. 16C (Step S65) followed by gravure cylinder S being separated from the stationary cone 7 by the pushing device 140 as shown in FIG. 16D (Step S66).

Then, the arm units 51 and 52 are downwardly moved to the preparatory mounting position (Step S67) after which arm units 51 and 52 are horizontally forwardly slidably moved and returned to the original point (Step S68).

In the one-hand holding mode, the left arm unit 52 is not horizontally transversely moved, but other operations are similarly to operations in the both-hand mode. That is, only the operation at the step S61 is not executed, but the operations corresponding to the operations from the step S62 to the step S68 are executed. However, it is noted that, at each of steps S63' and S68', only the right arm unit 51 is operated without the left arm unit 52 being operated.

Figure 29:
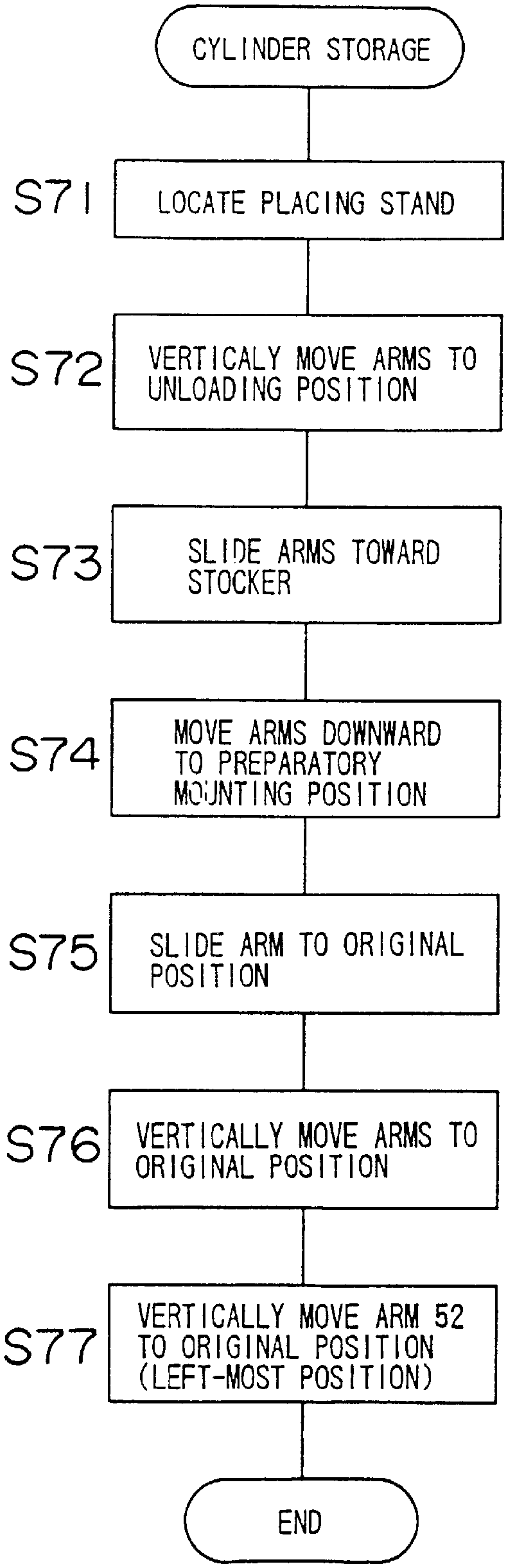
FIG. 29 is a flow chart illustrating in detail the gravure cylinder storing processing shown in FIG. 23.

FIG. 29 is a flow chart illustrating in detail the gravure cylinder storing processing at the step S7 in FIG. 23.

In the gravure cylinder storing processing, the positions of the placing stands 17 in the stocker 1 (See FIG. 1) are determined. More specifically, in FIG. 1, the chain 20 is circulated such that a vacant placing stand (on which a gravure cylinder to be stored has been placed before being engraved) is located in the position where a gravure cylinder can be unloaded or stored by the transport device 2 (the position where the placing stand 17*a* is located in FIG. 1) (Step S71).

Then, the arm units 51 and 52 are moved vertically such that the arm units 51 and 52 reach the unloading position (Step S72).

Then, the arm units 51 and 52 are forwardly slidably moved toward the stocker 1 (Step S73). In the so-called one-hand holding mode, the left arm unit 52 is not driven but only the right arm unit 51 is driven at the step S73.

Thereafter, the arm units 51 and 52 are downwardly moved to the preparatory mounting position (step S74). This causes the gravure cylinder supported by the arm units 51 and 52 to be transported to the placing stand 17*a* and supported by the holding portions 33 and 34 thereof (See FIG. 3).

Then, the arm units 51 and 52 are rearwardly slidably moved to the original point (Step S75). In the so-called one-hand holding mode, only the right arm unit 51 is driven at the step S75. This is because, at the step S73, the left arm unit 52 has not been moved but remained at the original point.

Then, the arm units 51 and 52 are vertically moved and returned to the original point. It is noted that the original point in the vertical direction may be optional and the operation at the step S76 may be omitted.

Then, the left arm unit 52 is moved leftwards (leftwards in FIG. 4 for example) up to the leftmost position serving as the original point (Step S77).

Other Embodiments

In the embodiment above-mentioned, the length of a gravure cylinder S is calculated based on the distance by which the left arm unit 52 has been moved from the second reference position. However, the length of a gravure cylinder S may be obtained by reading, with a linear scale or the like, the absolute value of the position where the left arm unit 52 has stopped.

Figure 30:
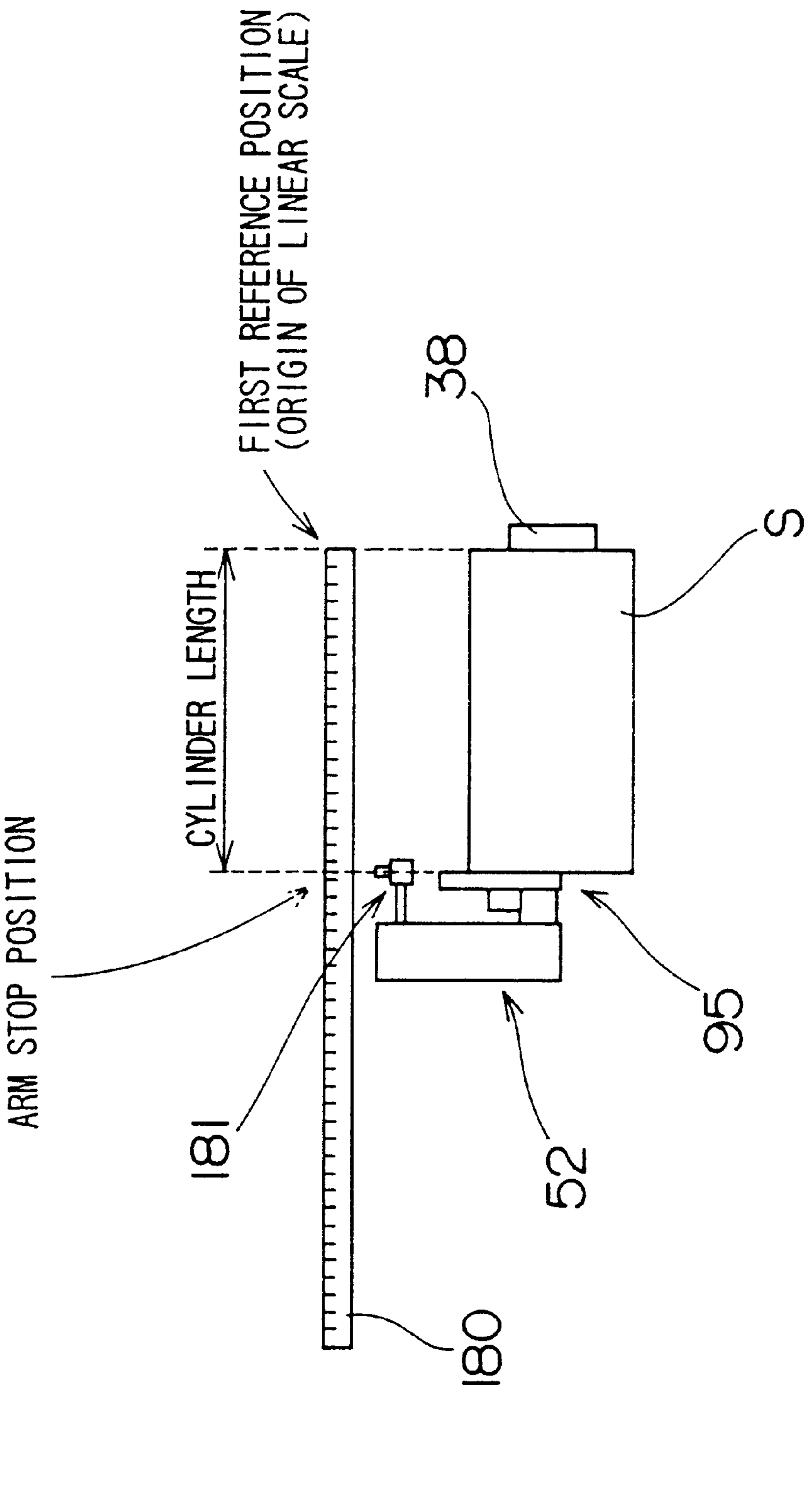
FIG. 30 is a schematic illustrating cylinder length measurement according to a further embodiment of the present invention.

This is schematically shown in FIG. 30. That is, FIG. 30 is a schematic plan view of an arrangement in which the length of a gravure cylinder is measured using a linear scale 180. In FIG. 30, the linear scale 180 is disposed in parallel with the transverse direction in which the left arm unit 52 is to be moved, and is arranged to measure the stop position of the left arm unit 52. More specifically , the left arm unit 52 has a reading device 181 for reading a division of the linear scale 180. This reading device 181 is arranged to read the absolute value of the stop position of the left arm unit 52 based on the first reference position. Here, the stop position of the left arm unit 52 refers to the position of the actuator 95 which comes in contact with the left end surface of the gravure cylinder S. In the embodiment in FIG. 30, the original point of the linear scale 180 is set to the first reference position which is the position of the regulating plate 38. Accordingly, the absolute value read by the reading device 181 is equal to the length of the gravure cylinder S. However, the original point of the linear scale is not necessarily set to the first reference position, and the length of the gravure cylinder S may be calculated based on a difference between the arm stop position and the first reference position.

In each of the embodiments above-mentioned, a transport device for a gravure cylinder has been discussed. However, there may be used, for transporting not only a gravure cylinder but also another article, the transport device of the present invention having the arrangement which is discussed particularly with reference to FIGS. 5, 6, 8, 9, 10, and 11, and which more specifically is constituted by the arm base members 53, the slide arm members 54 slidable on the arm base members 53, the support blocks 55 slidable on the slide arm members 54, and the motors 61 and the chains 62 for sliding the slide arm members 54 and the support blocks 55. For example, by matching the shape of the placing surface of each support block 55 with an article to be transported, the transport device may be applied not only to a gravure cylinder, but also to a printing plate, a material block to be machined, a mechanical unit or the like.

The foregoing has discussed in detail embodiments of the present invention. However, the foregoing embodiments are mere illustrative examples for disclosing the technical nature of the present invention, and the present invention should not be interpreted in a narrow sense by limiting same to these practical examples only. Hence, the true spirit and scope of the present invention should be limited only by the accompanying claims.

What is claimed is:

1. A gravure cylinder transport device comprising:

an arm for supporting a gravure cylinder from below and placed such that an axis thereof extends horizontally;

a drive device for moving said arm in an up-and-down direction in which the gravure cylinder is moved vertically, in a horizontal transport direction orthogonal to a gravure cylinder axial direction, and in the gravure cylinder axial direction;

a sensor disposed at said arm for detecting an end surface of the gravure cylinder;

a measurement control for controlling said drive device before the gravure cylinder is held by said arm, such that said arm is moved in the gravure cylinder axial direction and then stopped when said sensor has detected the end surface of the gravure cylinder; and a calculation for calculating a length of the gravure cylinder as a function of a behavior of said arm.

2. A transport device according to claim 1, further comprising:

a recognition device for recognizing, as a first reference position, a position relating to one end surface of the gravure cylinder placed such that the axis thereof extends horizontally; and a setting device for setting, as a second reference position, a position separated by a predetermined distance from the first reference position in the gravure cylinder axial direction toward the other end surface of the gravure cylinder; wherein said measurement control is arranged to control said drive device before the gravure cylinder is held by said arm, such that said arm is moved in the gravure cylinder axial direction from the second reference position and then stopped when said sensor has detected the other end surface of the gravure cylinder, and said calculator is arranged to calculate the length of the gravure cylinder as a function of extent of movement of said arm moved by said measurement control in the gravure cylinder axial direction, as a function of data of the first reference position recognized by the recognition device, and as a function of data of the second reference position set by the setting device.

3. A transport device according to claim 1, further comprising:

a recognition device for recognizing, as a first reference position, a position relating to one end surface of the gravure cylinder placed such that the axis thereof extends horizontally; and a setting device for setting, as a second reference position, a position separated, by a predetermined distance longer than the length of the gravure cylinder, from the first reference position in the gravure cylinder axial direction toward the other end surface of the gravure cylinder; wherein said measure control is arranged to control said drive device before the gravure cylinder is held by said arm, such that said arm is moved in the gravure cylinder direction from the second reference position to the first reference position and then stopped when said sensor has detected the other end surface of the gravure cylinder, the transport device further comprises a position detector for detecting a position in the gravure cylinder axial direction where said arm has stopped, and said calculator is arranged to calculate the length of the gravure cylinder as a function of the first reference position and as a function of the position where said arm has stopped.

4. A transport device according to claim 1, wherein before being held by said arm, the gravure cylinder is placed in a stock device which is disposed in a predetermined positional relationship with respect to said transport device, the gravure cylinder being placed such that the axis thereof extends horizontally, the stock device includes a regulator for regulating one end surface of the gravure cylinder, said transport device further comprises a recognition device for recognizing, as a first reference position, a position regulated by the regulator, and a setting device for setting, as a second reference position, a position separated by a predetermined distance from the first reference position in the gravure cylinder axial direction toward the other end surface of the gravure cylinder, said measurement control is arranged to control said drive device before the gravure cylinder is held by said arm, such that said arm is moved in the gravure cylinder axial direction from the second reference position and then stopped when said sensor means has detected the other end surface of the gravure cylinder, and said calculator is arranged to calculate the length of the gravure cylinder as a function of the arm behavior and data of the first reference position and/or data of the second reference position.

5. A transport device according to claim 1, wherein said arm is one of two arms, the two arms are disposed side by side in the gravure cylinder axial direction, said sensor is disposed at one of the two arms which is more remote from the first reference position, and only said arm at which said sensor is disposed and which is more remote from the first reference position, is moved in the gravure cylinder axial direction by said measurement control.

6. A gravure cylinder transport device, comprising:

an arm for supporting a gravure cylinder;

a drive device for moving the arm;

a gravure cylinder detector arranged to be relatively displaced with respect to the gravure cylinder in the course of a movement of the arm by means of the drive device; and a measurement device for measuring a size of the gravure cylinder based on an output of the gravure cylinder detector and the behavior of the arm.

7. A gravure cylinder transport device according to claim 6, wherein the drive device includes an axial driving device for moving the arm in an axial direction of the gravure cylinder supported by the arm; and wherein the measurement device includes a length measurement device for measuring a length of the gravure cylinder as a function of a position of the arm.

8. A gravure cylinder transport device according to claim 6, wherein the drive device includes a transverse driving device for moving the arm in a direction transverse to the axial direction of the gravure cylinder supported by the arm; and wherein the measurement device includes a diameter measurement device for measuring a diameter of the gravure cylinder as a function of the transverse movement of the arm.

* * * * *